United States Patent
James et al.

(10) Patent No.: US 10,459,890 B2
(45) Date of Patent: Oct. 29, 2019

(54) SYSTEMS AND METHODS FOR AUTOMATIC SYNCHRONIZATION OF RECENTLY MODIFIED DATA

(71) Applicant: Carbonite, Inc., Boston, MA (US)

(72) Inventors: Martyn Roland James, Westwood, MA (US); Shannon Lee Bain, Boston, MA (US); Christopher Nathan Dodge, Belmont, MA (US); Chresten D. Petersen, Boston, MA (US); Yuetian Xu, Canton, MA (US)

(73) Assignee: Carbonite, Inc., Boston, MA (US)

( * ) Notice: Subject to any disclaimer, the term of this patent is extended or adjusted under 35 U.S.C. 154(b) by 2 days.

(21) Appl. No.: 15/267,788

(22) Filed: Sep. 16, 2016

(65) Prior Publication Data

US 2017/0004050 A1    Jan. 5, 2017

Related U.S. Application Data

(63) Continuation of application No. 13/732,626, filed on Jan. 2, 2013, now Pat. No. 9,678,978.

(Continued)

(51) Int. Cl.
*G06F 16/178* (2019.01)
*G06F 16/18* (2019.01)
*G06F 11/14* (2006.01)

(52) U.S. Cl.
CPC ........ *G06F 16/178* (2019.01); *G06F 11/1451* (2013.01); *G06F 16/1873* (2019.01); *G06F 2201/80* (2013.01)

(58) Field of Classification Search
CPC ............. G06F 21/10; G06F 2221/2107; G06F 17/30174; G06F 21/80; G06F 17/3023;

(Continued)

(56) References Cited

U.S. PATENT DOCUMENTS 6,324,544 B1   11/2001   Alam et al.
7,739,411 B2   6/2010    Messer et al.
(Continued)

FOREIGN PATENT DOCUMENTS

GB    2 409 545 A      6/2005
WO    WO-02/075539 A2  9/2002

OTHER PUBLICATIONS

Canadian Office Action for Application No. 2894649 dated Sep. 7, 2016.

(Continued)

*Primary Examiner* — Angelica Ruiz
(74) *Attorney, Agent, or Firm* — Mark Chadjurian, Esq.; Gibb & Riley, LLC

(57) ABSTRACT

The present disclosure describes systems and methods for automatic synchronization of recently modified data between a plurality of devices. A device may identify newly utilized files stored on the device, and a synchronization engine may synchronize these files to one or more additional devices. The synchronization engine may record a storage location of the files on the first device, and may transmit the files for storage in a hidden directory on the other devices. After modification, a file may be synchronized back to the initial device. The synchronization engine on the initial device may retrieve the storage location of the modified file, and may replace the previous version of the file with the newly received modified file, in the original storage location. The user may view and edit recently utilized files on any device, while maintaining their original storage locations on each device and without having to manually manage files.

12 Claims, 25 Drawing Sheets

Related U.S. Application Data

(60) Provisional application No. 61/747,660, filed on Dec. 31, 2012.

(58) Field of Classification Search
CPC .............. G06F 2209/463; G06F 9/465; G06F 17/30289
USPC ........... 707/600–831, 899, 999.001–999.206
See application file for complete search history.

(56) References Cited

U.S. PATENT DOCUMENTS

| | | | |
|---|---|---|---|
| 7,774,774 | B1 | 8/2010 | Mulligan et al. |
| 7,860,962 | B2 | 12/2010 | White et al. |
| 7,885,925 | B1 | 2/2011 | Strong et al. |
| 8,005,789 | B2 | 8/2011 | Yoon et al. |
| 8,195,760 | B2 | 6/2012 | Lacapra et al. |
| 8,341,284 | B2 | 12/2012 | Piepenbrink et al. |
| 2003/0005161 | A1 | 1/2003 | Chen et al. |
| 2003/0172033 | A1 | 9/2003 | Risan et al. |
| 2005/0071390 | A1 | 3/2005 | Midgley et al. |
| 2005/0281185 | A1 | 12/2005 | Kawasaki |
| 2006/0259454 | A1 | 11/2006 | Greene et al. |
| 2007/0100905 | A1* | 5/2007 | Masters ................ G06F 21/568 |
| 2007/0198637 | A1* | 8/2007 | Deboy ................ H04L 65/4015 709/204 |
| 2007/0294321 | A1 | 12/2007 | Midgley et al. |
| 2007/0294366 | A1 | 12/2007 | Ozzie et al. |
| 2008/0288461 | A1 | 11/2008 | Glennon et al. |
| 2009/0083462 | A1 | 3/2009 | Song et al. |
| 2009/0150569 | A1 | 6/2009 | Kumar et al. |
| 2009/0210454 | A1 | 8/2009 | Sagar et al. |
| 2009/0282078 | A1 | 11/2009 | Thomas et al. |
| 2009/0328033 | A1 | 12/2009 | Kohavi et al. |
| 2010/0229224 | A1 | 9/2010 | Etchegoyen |
| 2011/0004584 | A1 | 1/2011 | Goyal et al. |
| 2011/0119371 | A1 | 5/2011 | Toshima et al. |
| 2011/0119663 | A1 | 5/2011 | Liu |
| 2011/0131184 | A1 | 6/2011 | Kirshenbaum |
| 2012/0030248 | A1 | 2/2012 | Blinnikka |
| 2012/0030378 | A1 | 2/2012 | Kaila et al. |
| 2012/0226933 | A1 | 9/2012 | Baptist et al. |
| 2012/0246267 | A1 | 9/2012 | Mallet et al. |
| 2012/0259964 | A1 | 10/2012 | Lin et al. |
| 2012/0290529 | A1 | 11/2012 | Baleedpalli et al. |
| 2012/0330887 | A1* | 12/2012 | Young ............... G06F 17/30017 707/610 |
| 2013/0151653 | A1 | 6/2013 | Sawicki et al. |
| 2013/0232121 | A1 | 9/2013 | Tucker et al. |
| 2014/0188803 | A1 | 7/2014 | James et al. |

OTHER PUBLICATIONS

EP Application No. 16161075.3, Examination Report dated Aug. 27, 2018, pp. 1-6.
Canadian Office Action for Application No. 2894649 dated Feb. 19, 2016.
Canadian Office Action for Application No. 2894649 dated Jul. 10, 2015.
Canadian Office Action for Application No. 2894649 dated Jun. 6, 2016.
Canadian Office Action for Application No. 2894649 dated Nov. 13, 2015.
EP Search Report for Application No. 13868458.4 dated Dec. 15, 2014.
European Examination Report on 13868458.4 dated Nov. 20, 2015.
European Rule 71 (3) on 13868458.4 dated Jun. 28, 2016.
Extended European Search Report on 16161075.3 dated Aug. 9, 2016.
International Search Report and Written Opinion for PCT/US2013/073102 dated Mar. 31, 2014.
Levy E et al, Distributed file systems: concepts and examples, ACM Computing Surveys, ACM, New York, NY, US, US, vol. 22, No. 4, Dec. 1, 1990 (Dec. 1, 1990), pp. 321-374, XP002392825, ISSN: 0360-0300, DOI: 10.1145/98163.98169 sections 2.1 and 2.3.2.
Notice of Allowance on U.S. Appl. No. 13/732,626 dated Jul. 15, 2016.
Office Action on U.S. Appl. No. 13/732,626 dated Jan. 6, 2016.
Office Action on U.S. Appl. No. 13/732,626 dated Jun. 2, 2014.
Office Action on U.S. Appl. No. 13/732,626 dated Sep. 24, 2015.
Office Action on U.S. Appl. No. 13/732,626 dated Jan. 14, 2015.
Sinitsyn, A.; "A Synchronization Framework for Personal Mobile Servers", Pervasisve Computing and Communications Workshops, 2004. Proceedings of the Second IEEE Annual Conference on, Piscataway, NJ, USA, IEEE, Mar. 14, 2014.

* cited by examiner

| Database 102 |
|:---:|
| File Name |
| File Location |
| File ID |
| Root file ID |
| Parent file ID |
| Creation time |
| Modification time |
| Tags |
| Comments |

SYSTEMS AND METHODS FOR AUTOMATIC SYNCHRONIZATION OF RECENTLY MODIFIED DATA

RELATED APPLICATIONS

The present application claims priority to and is a continuation of U.S. application Ser. No. 13/732,626, filed Jan. 2, 2013, titled "Systems and Methods for Automatic Synchronization of Recently Modified Data" which in turn claims priority to and the benefit of U.S. Provisional Application No. 61/747,660, entitled "Systems and Methods for Automatic Synchronization of Recently Modified Data," filed Dec. 31, 2012, the entirety of which are hereby incorporated by reference.

FIELD

The present application relates to systems and methods for automatic synchronization of recently modified data between a plurality of devices.

BACKGROUND

Typical online backup or synchronization systems provide synchronization of data within a predetermined folder on each of a plurality of devices. A user may place a file into a designated folder on a first device, and the file may be copied via a network, such as the Internet, to similar designated folders on one or more additional devices. The user may edit the file on any device, and upon saving the edits, the modified file may be copied or synchronized to each other device.

While these systems allow users to work on what are effectively the same data files in a variety of locations, users must still manually manage which files are synchronized, by adding or removing files from the designated folder. For example, because many subscription-based synchronization systems have data limits, a user may manually remove older files from the designated folder to free space for new files. If the user then needs to work on the older files again, the user may need to repeat this process in reverse. Accordingly, management of which files are synchronized may be cumbersome and time-consuming.

Additionally, because the user must manually move files to and from the designated synchronization folder, the user may unintentionally create multiple versions of a file. For example, if a user copies a file from a work folder to the synchronization folder, rather than moving the file, the user will have separate copies of the file and may later have to determine which file is the latest version. Furthermore, because designated synchronization folders may be in different locations on different operating systems or versions of operating systems, the user may need to remember multiple storage paths for the same file.

Additionally, once a file is synchronized to multiple devices, it may not be clear on which device the file was initially created. This may be confusing to a user who may think of a file as "the document I created at home on Saturday," rather than by name or path.

Other systems attempt to avoid the management required when using designated folders by creating application-specific libraries for data. For example, images may be associated with a photo viewing application and stored in a special library for the application. This library may be synchronized to libraries on other devices of the user, allowing the user to view the same images in photo viewing applications on each device. While this avoids folder-based synchronization management, each file type to be synchronized must be manually configured by the system manufacturer, and because files are only stored in the application-specific library, the files may only be accessible via the application. Accordingly, use of different file types by a single application may be complicated or impossible, if the application has not been explicitly configured to utilize multiple libraries. For example, while a word processing application may be explicitly configured to access a photo library to insert images, it may not have been configured to access rendered images of a 3D drawing application. In such library-based systems, because the user cannot traverse a directory structure to access the rendered images, the user may be unable to add the images to a word processing document.

Accordingly, none of these systems provide an easy and intuitive system for a user to access all of their recently modified or created files, regardless of file type or storage location, on any device.

SUMMARY

The present disclosure describes systems and methods for automatic synchronization of recently modified data between a plurality of devices. A file system watcher on a device may identify newly created, modified, or accessed files stored on the device, and a synchronization engine may initiate synchronization of these newly created, modified, or accessed files to one or more additional devices. The synchronization engine may record or store an identification of a storage location of the files on the first device, and may transmit the files for storage in a hidden folder or directory on the other devices. A synchronization engine on each of the other devices may display an identification of the transmitted files to a user of the other devices, such as the same user or a different user. If a user of one of the other devices updates or modifies a file or the same user updates or modifies the file on one of the other devices, the modified file may be transmitted or synchronized back to the initial device. The synchronization engine on the initial device may retrieve the identification of the storage location of the modified file, and may replace the previous version of the file with the newly received modified file, in the original storage location of the file. Accordingly, the user may view and edit recently created, modified, or accessed files on any device, while maintaining their original storage locations on each device and without having to manually manage files.

In one aspect, the present disclosure is directed to a method for automatic synchronization of recently modified data between a plurality of devices. The method includes a first device identifying a first file stored in a first storage device, the first file having a modification time within a predetermined time period of a present time. The first device may store, responsive to the identification of the first file having a modification time within the predetermined time period of the present time, an identification of a storage location of the first file in the first storage device in a second file in the first storage device. The first device may transmit the first file to a second device, which may be another device used by the same or a different user, or may be an intermediary device operated by a storage and/or synchronization provider. The method also includes the first device receiving, at a subsequent time, a further modified version of the first file from the second device. The first device may retrieve the identification of the storage location of the first file in the first storage device from the second file. The method further includes the first device replacing the first file in the first storage device with the further modified version of the first file. The identification of the storage location of the first file is not transmitted to the second device, and the first device does not receive the identification of the storage location of the first file from the second device.

In one embodiment, the method includes transmitting the first file for storage by the second device in a hidden directory of a second storage device. In another embodiment, the method includes identifying the first file responsive to an active window title bar name comprising a name of the first file. In a further embodiment, the method includes identifying, from a file system of the first device, a plurality of files including the first file having modification times within the predetermined time period of the present time, and identifying the first file of the plurality of files responsive to the active window title bar name comprising the name of the first file.

In some embodiments, the method includes receiving, by the first device from the second device, an identification of a modified version or newly created version of a second file. The method also includes determining, responsive to a synchronization policy, not to retrieve the second file. The method further includes displaying, by the first device to a user, an indication that the second file was modified. In a further embodiment, the synchronization policy identifies a file type that should not be retrieved. In another further embodiment, the synchronization policy identifies a file size threshold, such that files with sizes exceeding the threshold should not be retrieved. In yet another further embodiment, the method includes subsequently retrieving the modified version of the second file from the second device, by the first device responsive to a request of the user.

In another aspect, the present disclosure is directed to a method for automatic synchronization of recently modified data between a plurality of devices. The method includes receiving, by a first device maintaining a first storage device, a first file stored in a second storage device maintained by a second device, the first file having a modification time within a first predetermined time period of a present time. The method also includes storing, by the first device, the first file in a hidden directory of the first storage device maintained by the first device. The method further includes displaying, by the first device to a user, an identification of the first file and the modification time. The first device does not receive an identification of a storage location of the first file in the second storage device.

In one embodiment, the method includes modifying, by the first device at a subsequent time, the first file in the hidden directory of the first storage device. The method also includes transmitting, by the first device to the second device, the modified first file to replace the first file stored in the second storage device. In such embodiments, the first device does not transmit the storage location of the first file in the second storage device to the second device.

In another embodiment, the method includes identifying the modification of the first file responsive to an active window title bar name comprising a name of the first file. In a further embodiment, the method includes identifying, from a file system of the first device, a plurality of files including the first file having modification times within a second predetermined time period of the present time, and identifying the modification of first file of the plurality of files responsive to the active window title bar name comprising the name of the first file.

In yet another embodiment, the method includes displaying an identification of the first file in a list of recently modified files of the first device and second device. In still yet another embodiment, the method includes receiving, by the first device from the second device, an identification of a modified or newly created version of a second file. The method also includes determining, responsive to a synchronization policy, not to retrieve the second file. The method further includes displaying, by the first device to the user, an indication that the second file was modified or created. In a further embodiment, the method includes retrieving, by the first device from the second device, the modified or created version of the second file, responsive to a request of the user.

In still yet another aspect, the present disclosure is directed to a method for automatic synchronization of recently modified data between a plurality of devices. The method includes receiving, by a first device from a second device, a first file stored in a first storage device maintained by the second device, the first file having a modification time within a first predetermined time period of a present time. The method also includes transmitting, by the first device to a third device, the first file for storage in a hidden directory of a second storage device maintained by the third device. In some embodiments, the transmission may be performed responsive to a request for the first file by the third device, or the third device may retrieve the first file from the first device. The first device does not receive an identification of a storage location of the first file in the first storage device.

In one embodiment, the method includes receiving, by the first device from the third device at a subsequent time, a further modified version of the first file. The method also includes transmitting, by the first device to the second device, the further modified version of the first file for replacement of the first file in the first storage device. The first device does not transmit the storage location of the first file in the first storage device to the second device in such embodiments.

In one embodiment, the method includes storing, by the first device, an indication that the first file is owned by the second device. In another embodiment, the method includes receiving, by the first device from the second device, an identification of a modified version of a second file. The method also includes determining, responsive to a synchronization policy, that the second file should not be transmitted to the third device. The determination may be made by the first device, by the second device, or by the third device. The method further includes transmitting, to the third device for display, an identification that the second file was modified, without transmitting the second file to the third device, responsive to the determination.

In a further embodiment, the synchronization policy identifies a file type that should not be transmitted to the third device. In another further embodiment, the synchronization policy identifies that files with sizes exceeding a predetermined file size threshold should not be transmitted to the third device. In still yet another embodiment, the synchronization policy identifies that files should not be transmitted to the third device if a connection between the first device and third device has a speed below a predetermined connection speed threshold. In yet another further embodiment, the method further includes the first device receiving a request from a user of the third device for the modified second file, and transmitting the modified second file to the third device, responsive to the request.

BRIEF DESCRIPTION OF THE FIGURES

FIG. 3 is a diagram of an exemplary database structure for providing automatic synchronization of recently modified data between a plurality of devices;

In the drawings, like reference numbers generally indicate identical, functionally similar, and/or structurally similar elements.

DETAILED DESCRIPTION

The following description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Figure 1A:
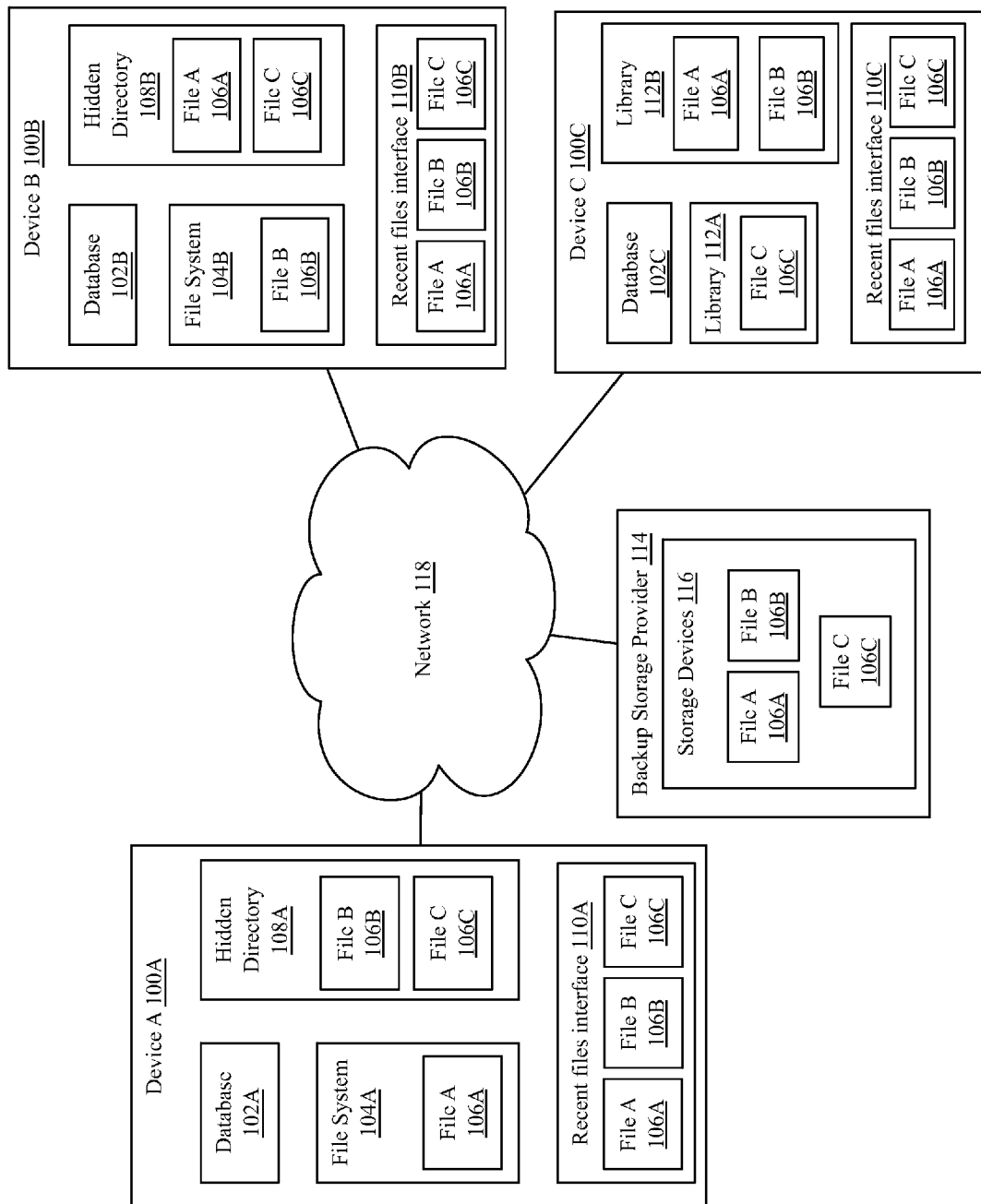
FIG. 1A is a block diagram of an exemplary system for providing automatic synchronization of recently modified data between a plurality of devices.

Referring first to FIG. 1A, illustrated is a block diagram of an exemplary system for providing automatic synchronization of recently modified data between a plurality of devices. As shown, one or more devices 100A-100C, referred to generally as device(s) 100, may be connected via one or more networks 118. A device 100 may comprise a desktop computer, laptop computer, tablet computer, smart phone, server, computer cluster, or any other type and form of computing device or devices. Network 118 may comprise one or more networks, including a local area network (LAN), wide area network (WAN) such as the Internet, or any combination of networks. Devices 100 may be connected to network 118 via wired connections or wireless connections, including cellular data connections and/or WiFi connections.

As shown, each device 100 may maintain a database 102A-102C, referred to generally as a database 102. Database 102, discussed in more detail in connection with FIG. 3, may maintain identifications of synchronized files and associations between the files and unique identifiers, tags, comments, parent-child relationships, and storage locations.

A device 100 may include a user-accessible file system 104A-104B, referred to generally as file system(s) 104. User-accessible file systems include file systems with directory structures that may be easily maintained and modified by the user, or via which the user may store files in a user-generated folder hierarchy. Examples of such systems include the directory structures of various versions of the Macintosh Operating System by Apple Inc. of Cupertino, Calif., in which users may create folders and move files between folders via the Finder application; or various versions of the Windows Operating System by Microsoft Inc. of Redmond, Wash., in which users may perform similar tasks via the Windows Explorer application.

By contrast, a device 100 may include a library-based file system, which may include one or more application-specific libraries 112A-112B, referred to generally as a library 112. A library 112 may comprise a directory of files accessible by an application and may be presented to the user via a user interface within the application. Storage locations of the files may be maintained by the application or operating system, without user interaction. An example of such a system includes the iOS operating system manufactured by Apple Inc., in which data files may be accessed by applications without user control over folder hierarchies or locations. Although discussed separately, library-based file systems may be based on a folder-based file system, but not normally maintained or edited by a user. For example, many photo album or media player applications may generate folders and place files within such folders in an application-generated naming scheme. However, the application may simply display the library to the user without specifying folder paths. Accordingly, in some embodiments of file systems 104, a user may be aware of file storage locations and paths, and not be aware of such in some embodiments of library-based file systems 112.

Files 106A-106C, referred to generally as file(s) 106, may comprise any type and form of data file, including images, videos, audio files, text files, database files, spreadsheets, or any other type of file. Files may also include executable files, compressed files or collections of files, or any other type of data.

As discussed above, files 106 may be stored in a user-accessible file system 104A-104B on a device, and/or may be stored in a library 112A-112B in a library based file system on a device. Additionally, files may be stored in hidden directories 108A-108B, referred to generally as a hidden directory or directories 108. A hidden directory 108 may comprise a storage location not visible to a user of the device in which synchronized files created on other devices may be stored, and may be maintained by a synchronization engine of the device, discussed in more detail in connection with FIG. 2.

A file may be created on any device, which may be referred to as the "owner" of the file. For example, a file 106A may be created on a first device 100A, which may be considered the owner of the file. The file 106A may be synchronized to additional devices 100B-100C. The file may be stored in a hidden directory 108B or may be placed in a library 112 for access by applications on the device. Similarly, a file 106B created on the second device 100B, or a file 106C created on the third device 100C may be synchronized to the other devices and placed in hidden directories 108A-108B and/or libraries 112A-112B. Accordingly, files may be visible in a user-accessible file system on the device on which they were created, but not on other devices.

Instead, each device may include a recent files interface 110A-110C, referred to generally as a recent files interface 110. Recent files interface 110 may comprise an application, service, utility, widget, daemon, or other executable logic for displaying files recently created, modified, or accessed to a user of the device, regardless of where they were created or initially stored.

In some embodiments, files 106 may be directly transmitted from one device 100 to another during synchronization. In other embodiments, an online synchronization or backup storage provider 114 may serve as an intermediary. For example, each device 100 may transmit files for synchronization to an online storage repository, comprising one or more storage devices 116 maintained by backup storage provider 114. Each device 100 may also retrieve files 106 uploaded by other devices 100 from the backup storage provider 114.

Figure 1B:
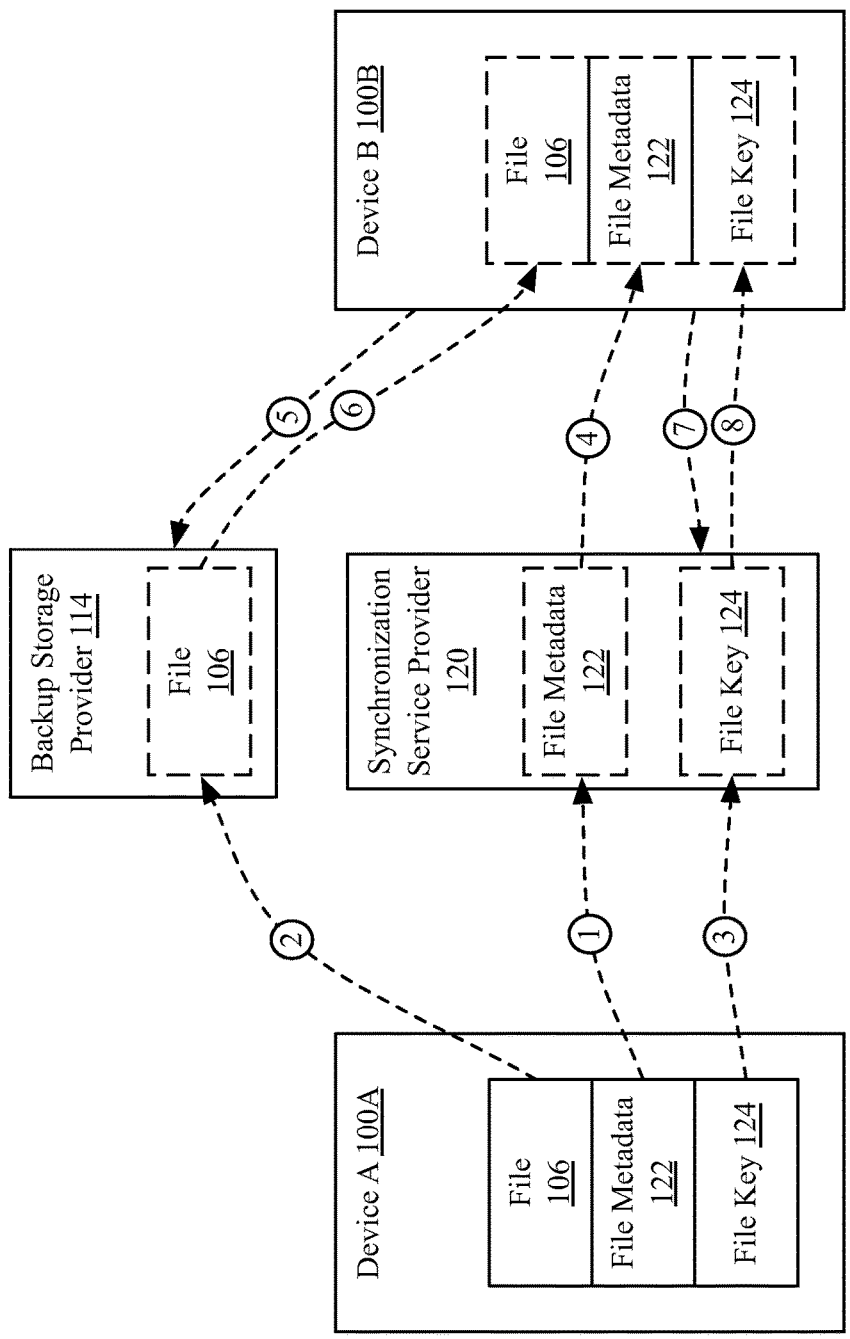
FIG. 1B is a block diagram illustrating an exemplary embodiment of synchronization of recently modified data.

Referring now to FIG. 1B, illustrated is a block diagram illustrating an exemplary embodiment of synchronization of recently modified data. As shown, in many embodiments, a plurality of device 100A-100B may communicate and be synchronized by one or more intermediaries, such as a backup storage provider 114 and/or a synchronization service provider 120. Although shown separate, in many embodiments, backup storage provider 114 and synchronization service provider 120 may comprise the same system. As with backup storage provider 114, synchronization service provider 120 may comprise one or more servers, such as a server farm or server cloud, for providing synchronization of files, metadata, and/or encryption keys between devices 100A-100B.

In many embodiments, metadata 122 of a file 106, such as identifiers of the file name, type, owner, time and date created, time and date modified, size, unique ID, version, or any other such identifiers, may be synchronized separately from the file 106. Metadata 122 may comprise an array, table, data structure, one or more data strings, a file header, or any other type and form of data structure for containing information about a file 106. As shown at step 1, in many embodiments, a device 100A may transmit metadata 122 of a file 106 to a synchronization service provider 120. The metadata 122 may be transmitted periodically, or transmitted responsive to an action by device 100A such as file creation, file modification, file deletion, file access, file renaming, file tagging, or performing any other such actions. In some embodiments (not illustrated), synchronization service provider 120 may request updated file metadata 122 and device 100A may transmit the file metadata 122 in response. Synchronization service provider 120 may store file metadata 122, update or replace previously stored file metadata, and/or may update a metadata database 102 as discussed here and illustrated in FIG. 3 with the metadata information.

At step 2, the device 100A may transmit the file 106 to a backup storage provider 114, which may be the same device or system of the synchronization service provider 120 or a different device or system, as discussed above. In some embodiments (not illustrated), upon receipt of metadata 122, synchronization service provider 120 may transmit a request to backup storage provider 114 to retrieve or request file 106 from device 100A at step 2.

In some embodiments, file 106 may be encrypted by device 100A. In some such embodiments, at step 3, device 100A may transmit an encryption key 124 to synchronization service provider 120. The encryption key 124 may comprise any type and form of key for encryption, using any type of private-key or public-key encryption scheme including any variety of the Advanced Encryption Standard (AES) such as AES-128, Data Encryption Standard (DES), or any other type and form of encryption algorithm. In many embodiments, the encryption key 124 may be file-specific and/or version-specific for a file, while in other embodiments, the encryption key 124 may be device and/or user-specific.

At step 4, the synchronization service provider 120 may transmit metadata 122 to device B 100B. The metadata 122 may be transmitted periodically, or in response to a request by device B for updated metadata. In some embodiments, metadata 122 may be transmitted as part of a metadata database as discussed in connection with FIG. 3, or may be transmitted separately.

At step 5, in some embodiments, device 100B may request transmission of file 106 from backup storage provider 114. Device 100B may request transmission of the file or may retrieve the file responsive to receiving updated metadata 122. In many embodiments, device 100B may apply a synchronization policy to updated metadata 122 to determine whether to retrieve or request file 106. For example, device 100B may determine not to retrieve or request the file responsive to the file type, file size, network bandwidth, free storage space, or any other such consideration. In other embodiments, device 100B may retrieve or request the file responsive to a command of a user of device 100B. For example, device 100B may display metadata 122 to the user, and the user may select to retrieve the file 106. At step 6, responsive to the request, backup storage provider 114 may transmit the file 106 to device 100B.

In some embodiments in which file 106 is encrypted, device 100B may also request the encryption key 124 from synchronization service provider 120 at step 7, which may be transmitted at step 8. In some embodiments in which backup storage provider 114 and synchronization service provider 120 are different systems, this may mean that encryption keys and files are not stored by the same intermediary system, increasing security. Furthermore, although illustrated with keys 124 traversing synchronization service provider 120, in many embodiments key storage and transmission may be performed by a separate service.

Figure 2:
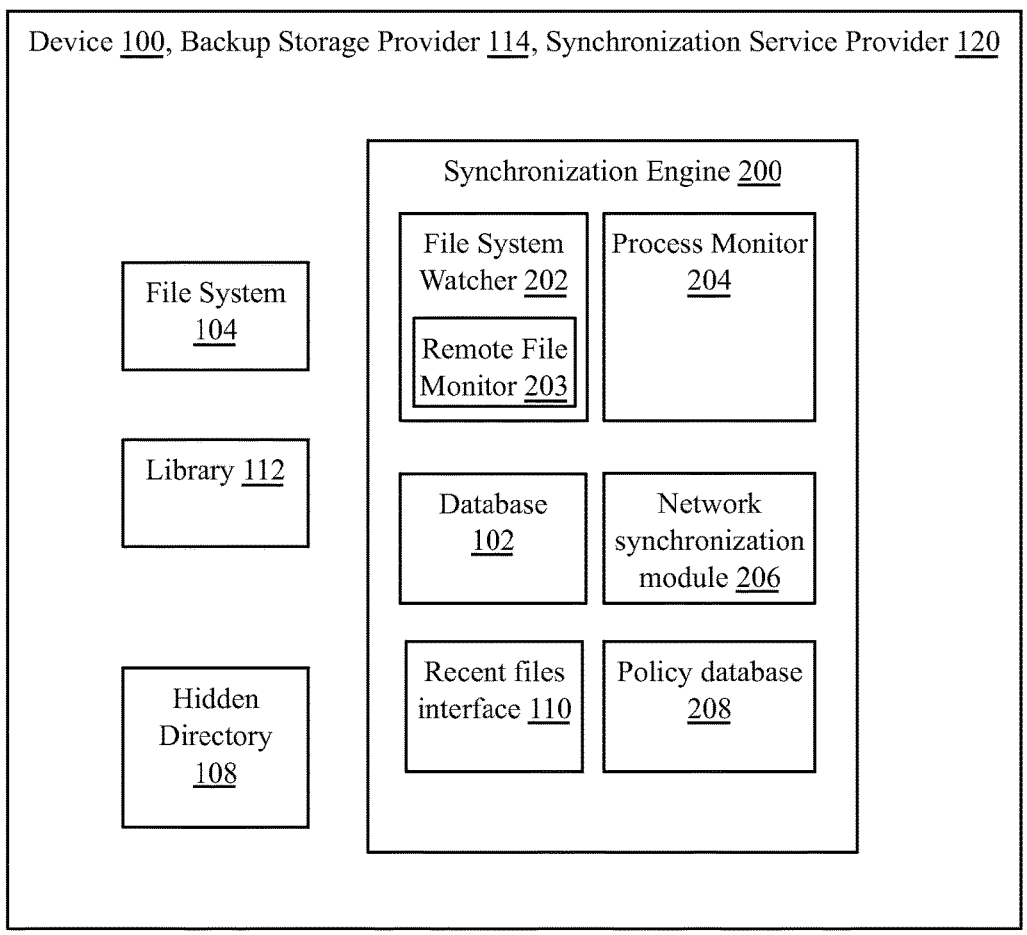
FIG. 2 is a block diagram of an embodiment of a synchronization engine.

Referring now to FIG. 2, illustrated is a block diagram of an embodiment of a synchronization engine 200, which may be executed by a device 100, by a backup storage provider 114, synchronization service provider 120, or any other such intermediary between devices 100. A synchronization engine 200 may comprise an application, service, server, daemon, or other executable logic for monitoring access to or modification of files on a device, and for transmitting files to or retrieving files from a remote device.

Synchronization engine 200 may maintain a database 102, which may comprise an identification of files owned by or created on the device and maintained in storage of the device. For example, referring to FIG. 3, illustrated is a diagram of an exemplary database structure for providing automatic synchronization of recently modified data between a plurality of devices. The database may include and associate a file name, file location including hierarchical path to the file, a unique file identifier, a root file identifier, and a parent file identifier. As files are modified, in order to maintain version tracking of files, a new unique file identifier may be generated for the file. The file may then be associated with the file identifier of the previous version or parent file identifier. As the file continues to be modified, the synchronization engine 200 may generate new file IDs and add the parent file ID to the database. Each file may also be associated with the root file ID or identifier of the original file. Accordingly, each entry in the database may identify the file, the immediately prior version of the file, and the original version of the file, thus creating a tree which may be traversed to identify any version of the file, up to its creation. This may be used for reconciling simultaneous modifications to a file on different devices (in which each modified file would then have a new file ID but would share the same parent ID and root ID), and may also be used for journaling and recovery of prior versions of files.

In some embodiments, the database may not include a root ID entry for the file. In such embodiments, the synchronization engine 200 may identify different versions of the file only via parent IDs. In other embodiments in which files may be shared among a plurality of users, the root ID may be used to control access to a file, since each version of the file will have the same root ID. For example, a user may be granted access to files having a specified root ID, and as new versions of the file are created through modifications by the user or other users, the user may still have access to the new versions via the root ID.

The database 102 may also identify a file creation and/or modification time, one or more tags for the file, and one or more comments for the file. Tags may be user generated or application generated, and may identify an application, a file type, or content flags. For example, a user may identify a file as work related or personal via a user interface, and the synchronization engine may add a corresponding tag to the database. Similarly, the user may add comments to file. Tags may also be added by an application, identifying times, dates, application types, geographic location that a picture was taken at, or any other such information. Tags and/or comments may also be used for automatic sharing and/or access control. For example, the user may specify that items with a specified tag should be synchronized to specific devices, or may be shared with one or more additional users and synchronized to devices of those users.

Returning to FIG. 2, synchronization engine 110 may comprise or communicate with a recent files interface 110. A recent files interface may comprise an application, service, or other executable logic for providing a graphical user interface to a user, allowing the user to view and select recently modified, created, or accessed files on any device 100. Recent files interface 110 may display recently modified, created, or accessed files in chronological order of said modification or access, in chronological order of creation date, in alphabetical order, or by size, type, or device, or any combination of these orders. For example, recently accessed files may be displayed in chronological order of access, grouped by device on which the file was accessed.

In some embodiments, the recent files interface may show the transfer status or synchronization status of files. For example, in one embodiment, a progress bar may be displayed next to each file illustrating transfer of the files to or from the device. In one embodiment, the progress bar may be oriented vertically and may fill in one direction, such as downward, to indicate the progress of a download of a file to the device, and may fill in the opposite direction, such as upward, to indicate the progress of an upload of the file from the device to a second device or online storage provider. In some embodiments, metadata of recently modified or accessed files may be downloaded and displayed by the interface 110, prior to download of the files being completed or, in some embodiments, initiated. For example, because metadata may be relatively small, a device may be quickly updated with a list of recently modified files on other devices, even over a limited bandwidth or cellular connection. A user may then select to open or view one of the listed files, and the selected file may be downloaded as required, reducing unnecessary transfers of large amounts of data that the user may not need.

Synchronization engine 200 may execute or include a file system watcher 202. File system watcher may comprise a service, daemon, routine, or other executable logic for monitoring, hooking, or intercepting commands to an application programming interface (API) or otherwise monitoring operations of a file system. For example, on a device utilizing a Microsoft Windows operating system, the file system watcher 202 may monitor FileSystemWatcher events updated by the operating system to detect files that are created, changed, deleted, renamed, moved, or otherwise accessed. Similarly, on a device utilizing an Apple Macintosh OSX operating system, the file system watcher 202 may utilize the FSEvents API or monitor an FSEvents log. Implementations on other operating systems may monitor similar processes or logs, or may perform periodic scans of one or more folders or libraries to detect changes to metadata of files within the folder or library. In some embodiments, the file system watcher 202 may be configured to monitor all file operations on a device, on a specified drive, or in a folder or folders.

In some embodiments, file system watcher 202 may also comprise or communicate with a remote file monitor 203. Similar to file system watcher 202, remote file monitor 203 may comprise an application, service, server, daemon, routine, or other executable logic for monitoring file creation, modification, deletion, or access on remote systems. For example, remote file monitor 203 may communicate with an API for interfacing with Google Drive provided by Google Inc. of Mountain View, Calif.; iCloud provided by Apple Inc. of Cupertino, Calif.; SkyDrive provided by Microsoft Corp. of Redmond, Wash.; or any other type and form of remote storage, sharing, or synchronization system including online concurrent versioning systems, cloud storage systems, or network storage devices. Similarly, remote file monitor 203 may monitor and/or retrieve files from online storage associated with social networking or sharing sites, such as Instagram, provided by Facebook, Inc. of Menlo Park, Calif.; or Flickr, provided by Yahoo! Inc. of Sunnyvale, Calif. Remote file monitor 203 may periodically request updates of file metadata and/or files via an API provided by such service providers, or may periodically monitor a publicly or privately accessible website, FTP site, or other service. For example, the remote file monitor 203 may perform HTTP GET requests for a webpage identifying files of a user on a social networking site and may compare the retrieved page to cached versions of the page to identify new files, which may then be retrieved separately.

In many embodiments of operating systems, a large number of files may be modified and/or accessed by the operating system without user intervention. For example, due to various logging processes, operations of subroutines within programs, reading of various application libraries or data files, etc., hundreds of files may be accessed or modified when a user executes a single application or opens a file. However, the files that are most likely of interest to the user are ones that are associated with windows displayed to the user, such as documents displayed by a word processing program, or images displayed by an image editing program. By contrast, unless specifically opened for viewing (and thus associated with a displayed window), log files or preference files may be updated without displaying a window, and are thus not likely of interest to the user. Accordingly, in order to filter out such non-user directed access to files from the recently used files list, the synchronization engine 200 may execute a process monitor 204. Process monitor 204 may comprise an application, service, daemon, routine, or other executable logic for monitoring executing processes and windows, and to compare window titles to the list of recently modified files. Upon identifying that a file has been modified, accessed, or otherwise used by a process via monitoring file system events, the process monitor 204 may identify any window titles of windows associated with the process. If a window title matches some or all of the file name, then the file is likely of interest to the user and may be included in the list of recently used files and/or placed at a higher priority in the list, or synchronized to other devices at a higher priority than other files. If no window of a process has a title matching the file, the file may be filtered from the recently used files list.

In some embodiments, synchronization engine 200 may execute a network synchronization module 206. Network synchronization module 206 may comprise an application, service, routine, daemon, or other executable logic for monitoring synchronization of other devices and/or for communicating with an online storage provider. Network synchronization module 206 may transmit periodic updates of recently modified files on the device 100, and/or periodically request updates of recently modified files on other devices or on the online storage provider. In some embodiments, network synchronization module 206 may request and receive modified or newly created files, while in other embodiments, network synchronization module 206 may first receive metadata for modified or newly created files and determine, based on a policy or responsive to a request by a user, whether to retrieve the file from the remote device or online storage provider. Metadata for all of the files may still be received displayed in the list of recently used files, even if the files themselves are not retrieved. In conjunction with a policy database 208 maintained by synchronization engine 200, network synchronization module 206 may determine to only retrieve files under a size threshold, or files of a specified type, or files created on a particular device, or files under a size threshold if a network connection has a bandwidth of less than a second threshold, or responsive to any other such policy or combination of policies. For example, a user may specify that they wish to only retrieve photos on their smart phone that are less than 5 MB in size, or documents created on their home computer but not their work computer. Synchronization policies may be based on one or more of a storage location, a device, a file type, an associated application, a modification date or time, a size, a network bandwidth, a user name, a tag or comment, or any other such information associated with a file.

The synchronization engine may store metadata received from other devices or a storage provider in database 102, as well as storing metadata associated with files originating on the device 100 in database 102. In many embodiments, storage locations of files may not be shared with other devices as part of the shared metadata. For example, a user may generate a first file on a device and store the file in a folder in a folder hierarchy of a file system 104. The synchronization engine 200 may generate a record in database 102 for the file with a corresponding file identifier. The synchronization engine 200 may record the location of the file in an entry in database 102, and may transmit the file and/or metadata of the file to another device or a storage provider, the metadata including the file name, type, size, creation or modification date, tags, comments, thumbnails, or any similar information specific to the file, but not including the storage location of the file on the device. A second device may store the metadata in a second database 102, and may store the file within a hidden directory 108. The user of the second device may access the file via the recent files interface, including open the file in an application, editing comments or tags of the file, viewing a preview of the file, changing sharing permissions or other attributes of the file, without needing to traverse the file system of the second device to locate the file.

Upon modification of the file on the second device, the synchronization engine 200 of the first device may receive an updated version of the file, either from the second device or via an online storage provider. The synchronization engine 200 may identify the original storage location of the file from database 102, and may save the modified version of the file in the same location, overwriting the previous version of the file. Accordingly, the user may always find the file in its original location on the first device, regardless of whether it has been modified or viewed on other devices, and without needing to manually manage synchronization of folders. Furthermore, the system does not need to generate additional folders on other devices to correspond to a file path on the first device that may be inapplicable.

Additionally, as discussed above, in embodiments of devices with library-based file systems, files may be stored in application-specific libraries on each device as necessary, and may be synchronized back to their original storage location in folder-based file systems, without any effort by the user. Similarly, if the file is created on a device utilizing a library-based file system, the file may be synchronized to other devices and stored in a hidden folder, thus avoiding having to generate folders corresponding to each application on the first device in a way that may be confusing to users.

Figure 4A:
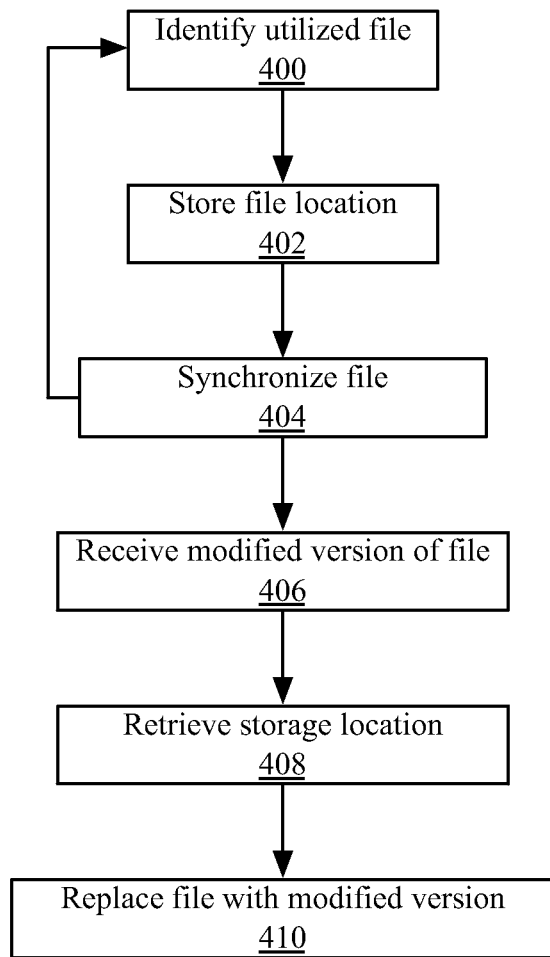
FIGS. 4A-4C are flow charts of embodiments of automatic synchronization and modification of files on a plurality of devices.

Referring now to FIG. 4A, illustrated is a flow chart of an embodiment of automatic synchronization and modification of files on a plurality of devices. At step 400, a synchronization engine of a first device may identify a first file stored in a first storage device that has been recently utilized. As discussed above, the synchronization engine may identify files that have been recently created, renamed, moved, modified, commented, tagged, viewed, opened, accessed, written to, or otherwise utilized by a user. For example, in one embodiment, the file may have a modification time within a predetermined time period of the present time. In another embodiment, the file may have a modification time during the interim period since the synchronization engine last checked for updated files. As discussed above, the synchronization engine may scan file system update logs for updated files, receive notifications from a file system watcher when a file is updated, intercept file system commands, and/or scan a directory for metadata changes. In some embodiments, as discussed above, the system may identify that a modified or accessed file corresponds to an active window of an executing process, or has a file name that matches or partially matches a name of a window or a name displayed in a window title bar. Accordingly, in some embodiments, the predetermined time period may represent a periodic frequency at which the system checks for recently modified files, a time since last launch of the synchronization engine, a time since a last update to the file system, or any other such time.

At step 402, the synchronization engine may store an identification of a location of the identified file in a database. The location may be stored as an absolute or relative path through a directory structure, as a memory location, or any other such means. As shown, steps 400-404 may be repeated in some embodiments. In many such embodiments, when a file is subsequently utilized, the synchronization engine may update the location of the identified file as necessary at step 402, or may skip step 402 if the file is not moved.

At step 404, the synchronization engine may synchronize the file to a second device and/or an online storage or backup provider. Synchronizing the file may comprise transmitting the file to the second device or online storage provider, or may comprise transmitting metadata of the file or a notification of modification of the metadata to the second device or online storage provider. In some such embodiments, the second device may request transmission of the file, for example, based on a synchronization policy of the second device. In other embodiments, the second device or online storage provider may periodically request transmission of files, or may request transmission of files responsive to a network connection between the first device and the second device or online storage provider having sufficient bandwidth. After synchronization, the file may be stored in a hidden directory on the second device, and presented to the user via a recent files interface.

At step 406, the first device may receive a modified version of the file from the second device or via the online storage provider. In some embodiments, the first device may periodically request updates or synchronization of files and/or metadata from the remote device or provider, while in other embodiments, the remote device or provider may transmit a notification that the file has been modified. In one embodiment, the remote device or provider may transmit metadata to the first device, and the first device may request the modified file from the remote device or provider.

At step 408, the first device may retrieve the stored identification of the file location from the database, and at step 410, the first device may store the received modified file in the location, replacing the previous version of the file with the modified version. In some embodiments, the first device may store the received file as a new version of the file, while in other embodiments, the first device may simply overwrite the file. In one embodiment, the first device may receive the modified version of the file from an online storage or backup provider which may save the prior version of the file to allow recovery or undoing of changes. In some embodiments, the first device may perform step 408 prior to step 406, such as where the first device receives metadata or notification of a modification to the file, retrieves the storage location for the file, and then requests transmission of the file from the remote device.

Accordingly, through the above method, files may be synchronized to different devices for display in a recent files interface and access by a user, while maintaining the original storage location of the file and resynchronizing modifications to the file to the original storage location. Advantageously, this method also does not expose information about a file structure to remote devices, which may provide some measure of security against malicious software.

Figure 4B:
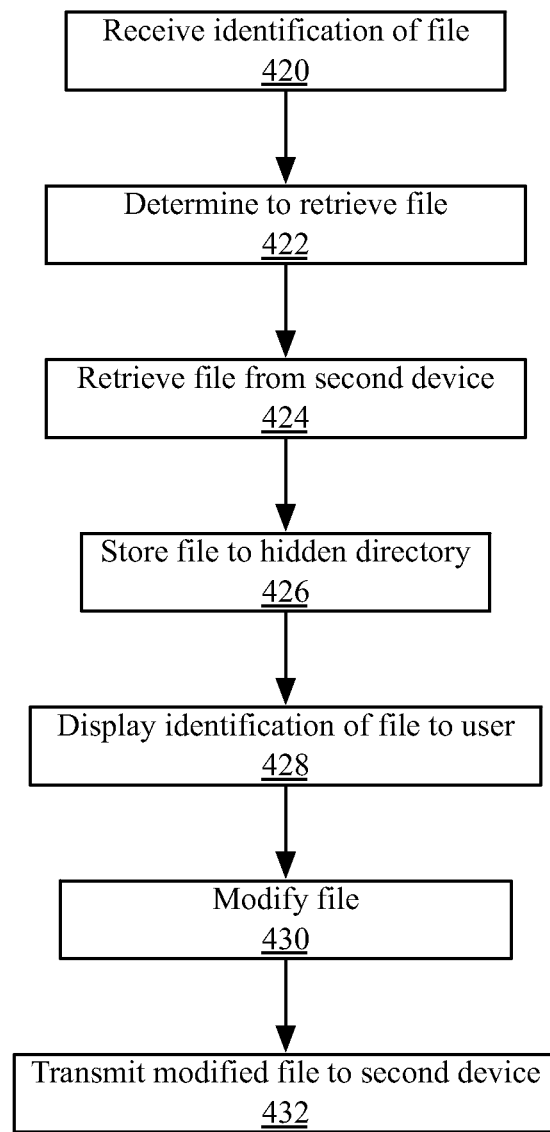

Referring now to FIG. 4B, illustrated is a flow chart of another embodiment of a method for synchronizing recently modified files between a plurality of devices. At step 420, a device may receive a notification or identification of one or more modified files on a second device or stored by an online storage provider. In one embodiment, the device may receive a notification that one or more files have been updated, and may request metadata of the updated files. In other embodiments, the device may request metadata of any updated files and receive the metadata. As discussed above, for files generated on or owned by a remote device, the metadata and/or notification may not identify a storage location of the file on the remote device.

At step 422, the device may determine whether to retrieve the file. As discussed above, the device may apply one or more synchronization policies to determine whether to request transmission of the file to the device. Variables may comprise a sharing policy for the file, a name of the file, a file type of the file or associated application for the file, a creation or modification date of the file, a size of the file, a tag or comment on the file, an amount of free storage on the device, a bandwidth, latency, or error rate of a connection of the device, an indicated priority of the file, or any other such information. In some embodiments, the device may determine to retrieve the file responsive to a user command. For example, the device may display a notification that a file has been modified to the user via a recent files interface, and the user may select to download or view the file.

At step 424, the device may retrieve the file from the second device or the online storage provider. Retrieving the file may comprise requesting transmission of the file or downloading the file from the remote device. Upon receiving the file, at step 426, the device may store the file in a hidden directory on the device. The hidden directory may be flagged to be not visible to a user-accessible file system, may be stored in a non-user accessible or viewable partition of a file system, or may be otherwise inaccessible to the user. For example, in a library-based file system, the hidden directory may comprise a library specific to the recent file interface application.

At step 428, the device may display an identification of the file to the user via a recent file interface. As discussed above, the device may display the file in a list with other files, which may be arranged chronologically, alphabetically, by type or application, by tag, by shared status, by owner, or via any combination of these or other identifiers. As discussed above, in some embodiments, step 428 may be performed prior to steps 422-426, presenting the identification of the file to the user based on received metadata.

At step 430, the user may modify the file. Modifying the file may include modifying the metadata of the file, such as changing sharing permissions, adding a comment or tag to the file, modifying the contents of the file, or otherwise interacting with the file. In some embodiments, modifying the file may include opening or accessing the file, such that an access time in metadata of the file is updated. As discussed above, in some embodiments, the device may determine that the file is modified responsive to comparing file names of modified or accessed files to window title bars of processes executing on the device, to filter out files accessed by the system without intervention by the user.

Responsive to the modification, at step 432, the device may transmit the modified file and/or metadata of the modified file to a second device or to an online storage or backup provider. Having not received an identification of a storage location of the file on a device that has ownership of the file, the device may not transmit such an identification of the storage location to the second device or online storage or backup provider.

Figure 4C:
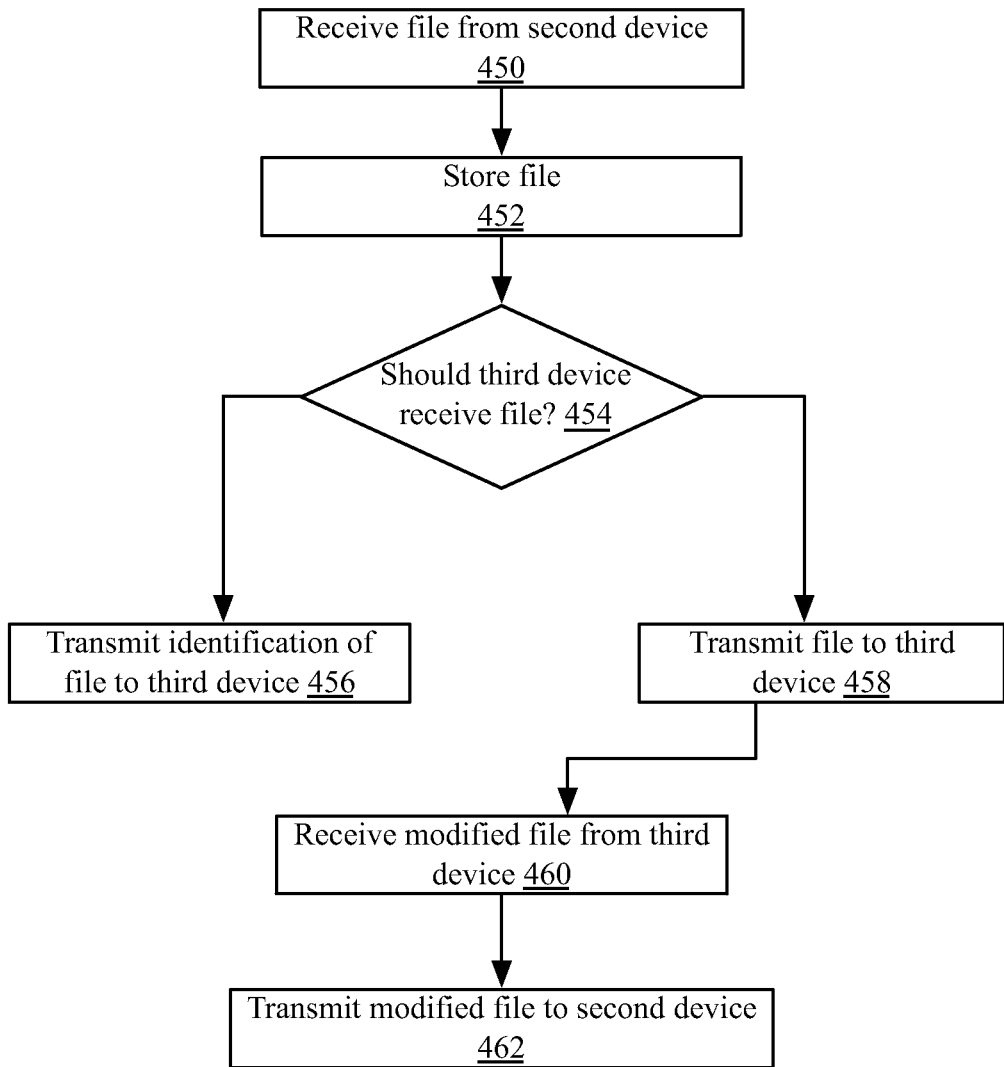

Referring now to FIG. 4C, illustrated is another embodiment of a method for synchronizing recently used files to a plurality of devices. At step 450, a device provided by an online storage or backup provider or other such device may receive a file from a second device, the file stored in a location on a storage device maintained by the second device. The file may be recently modified, created, or accessed, as discussed above. At step 452, in some embodiments, the device may store the file in a storage repository for archival, recovery of previous versions, or other such tasks.

At step 454, in some embodiments, the device may determine whether a third device should receive the file. The device may apply a synchronization policy, as discussed above, which may specify that the file should or should not be synchronized to the third device, responsive to size of the file, network connection bandwidth, type of file, application associated with the file, tags or comments of the file, users associated with the file, or any other such information. If the device determines the file should not be synchronized or transmitted to the third device, in some embodiments, at step 456, the device may transmit metadata of the file or a similar identification of the file to the third device for display in a recent files interface. Otherwise, the device may transmit the file to the third device at step 458 for storage in a hidden directory of the device.

At step 460, the device may receive a modified version of the file from the third device. In some embodiments, the device may receive a notification that the file has been modified, or may receive metadata of the modified file, and may then request transmission of the file. In other embodiments, the device may periodically request synchronization of updated or modified files, and responsive to receiving a notification of an updated or modified file, may request transmission of the file. Similarly, at step 462, the device may transmit the file to the second device, or may transmit notification of a modification to the file and/or the metadata of the modified file to the second device such that the second device may request transmission of the file.

Figure 5A:
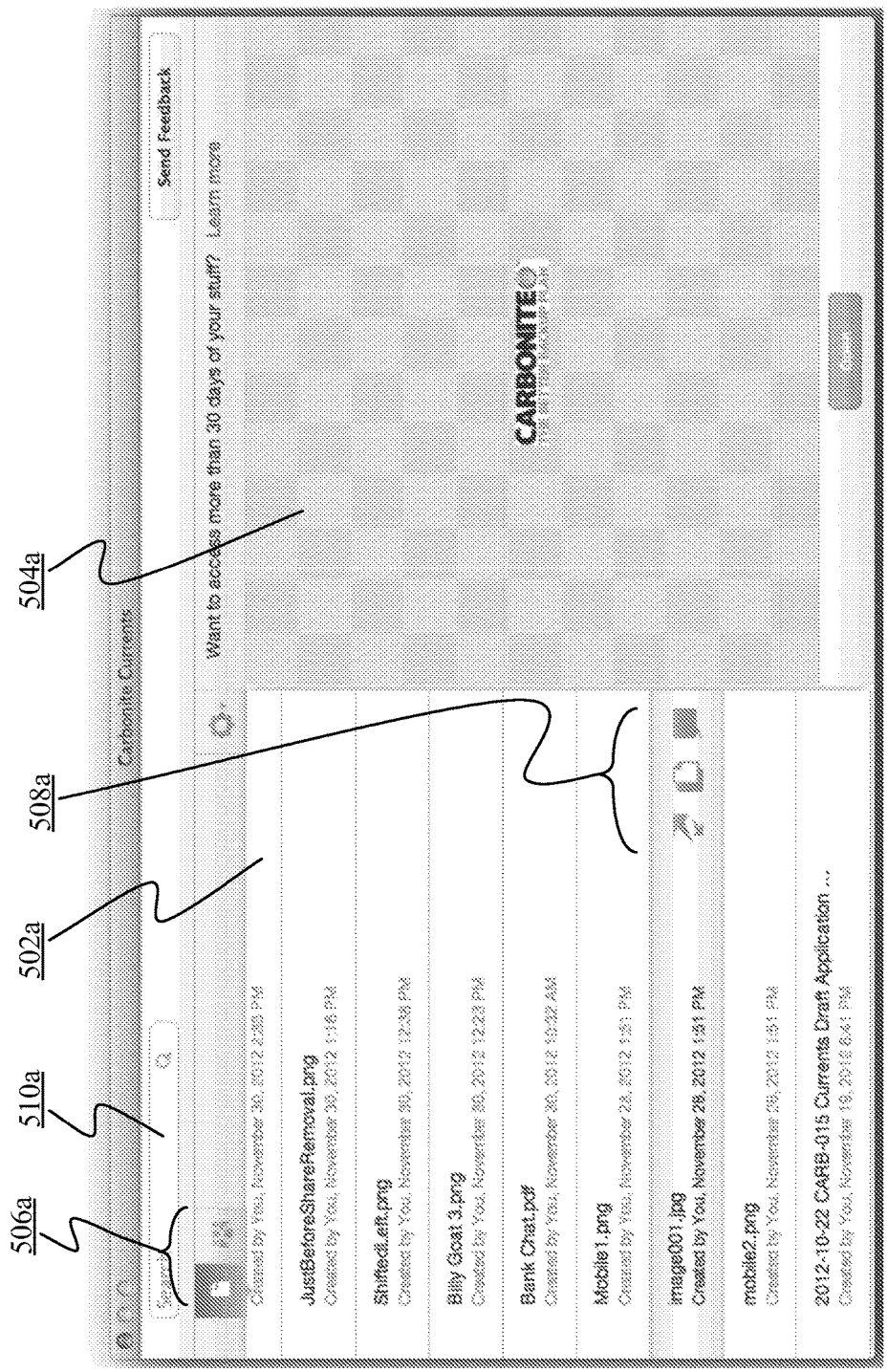
FIGS. 5A-5Q are screenshots of exemplary embodiments of a user interface for automatic synchronization and modification of files on a plurality of devices.
Figure 5B:
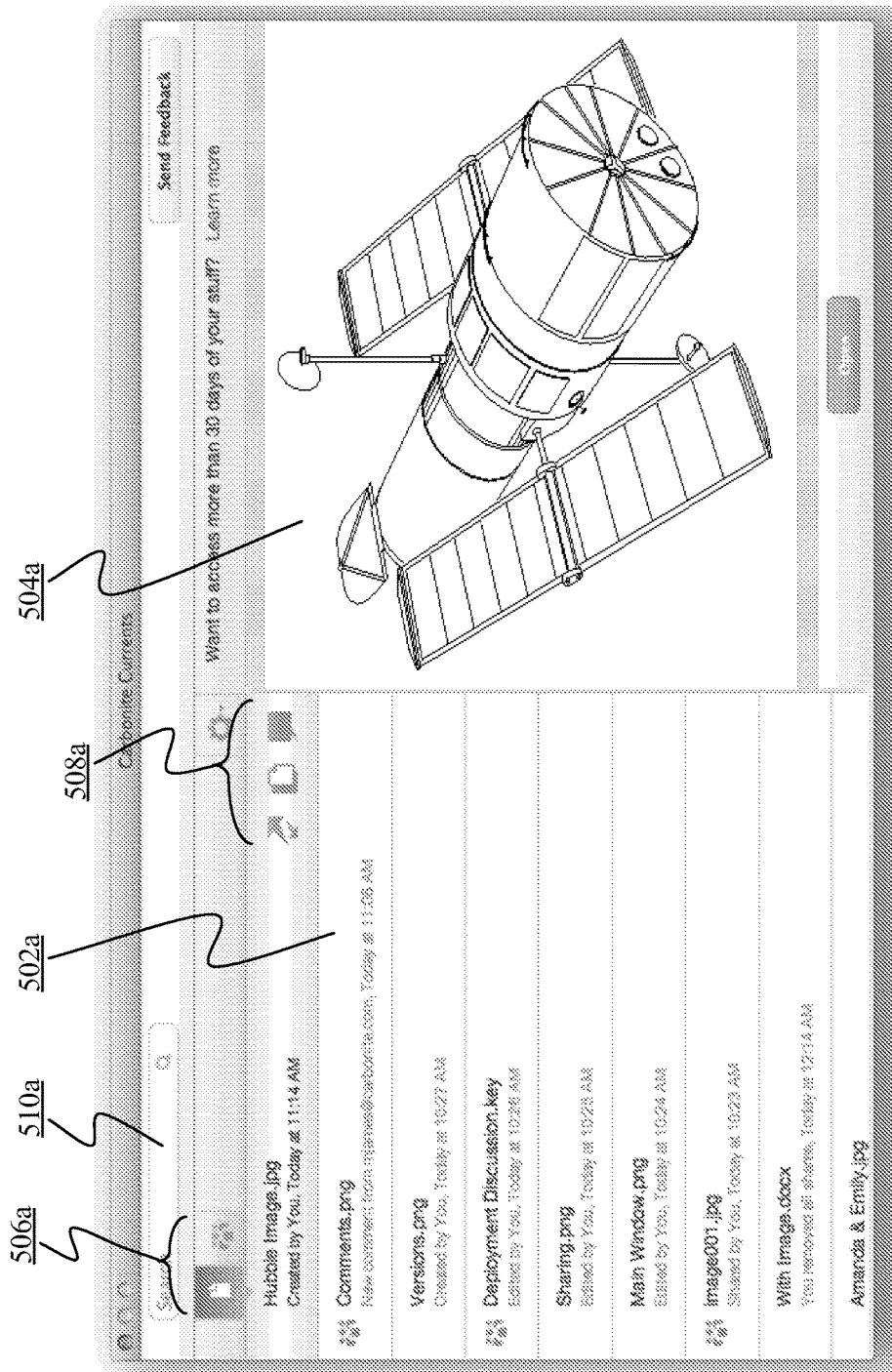
Figure 5C:
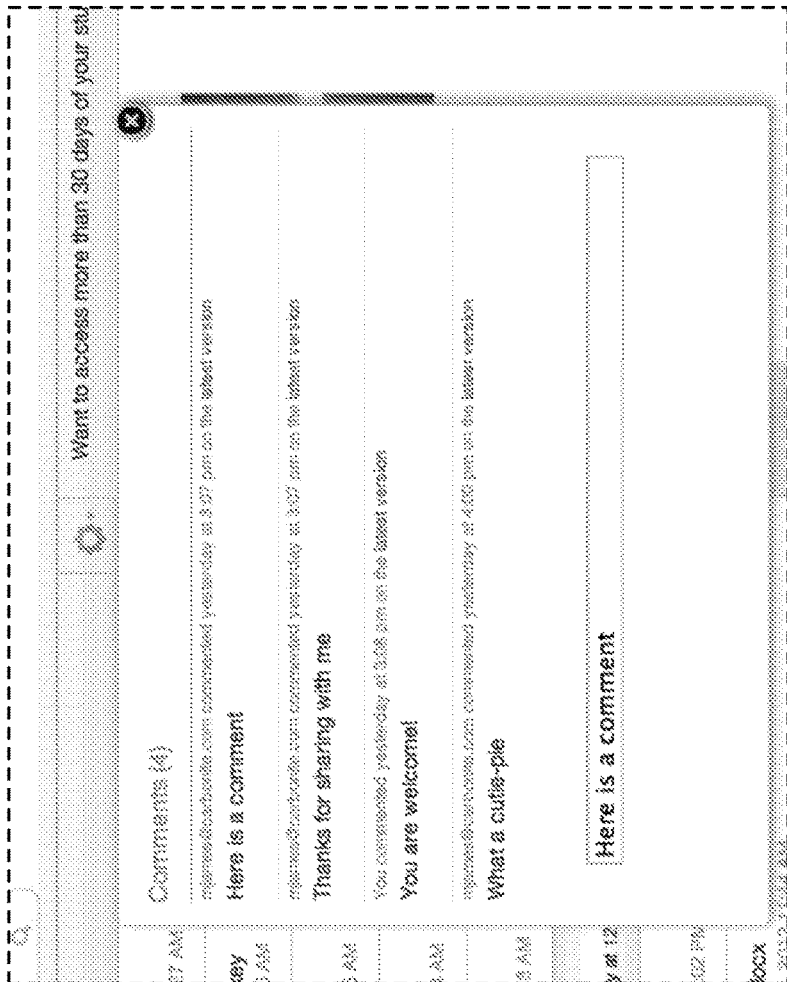
Figure 5D:
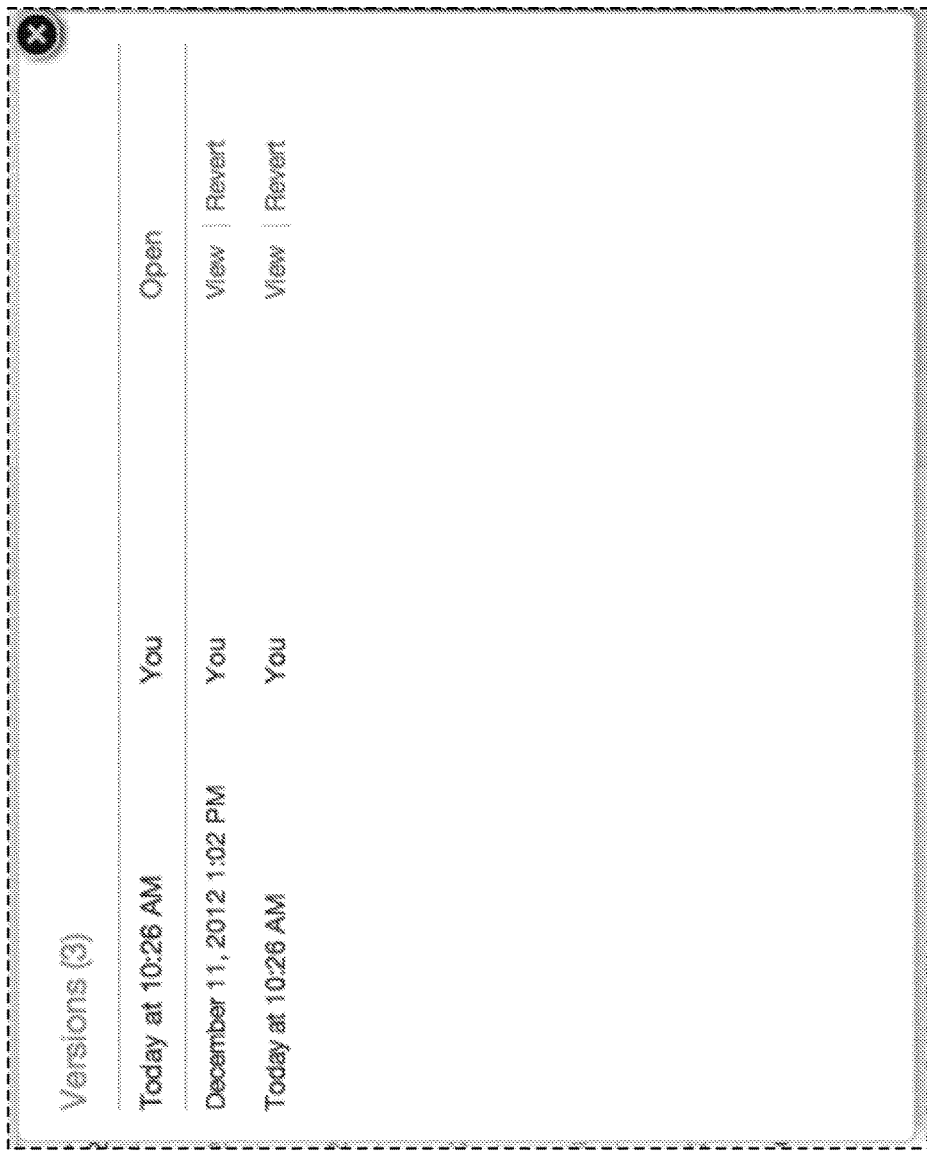
Figure 5E:
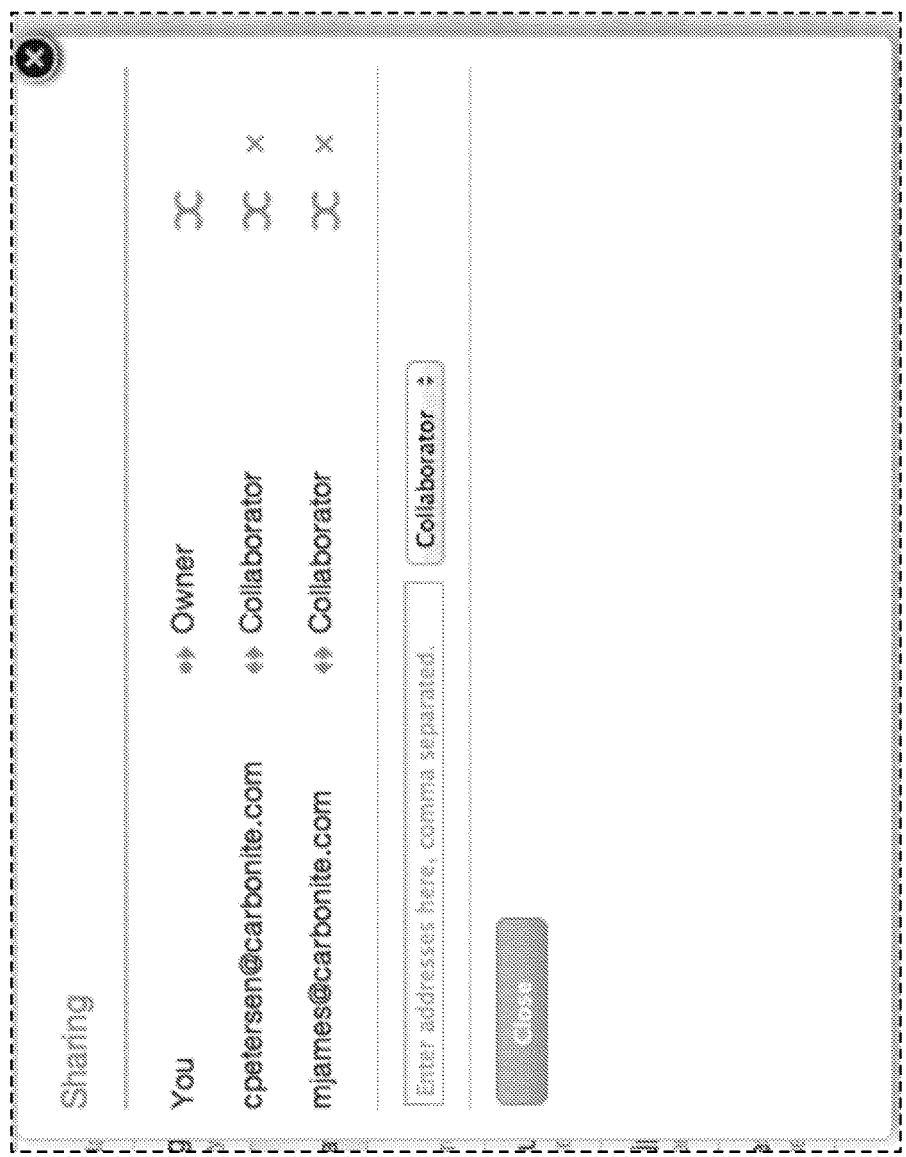
Figure 5F:
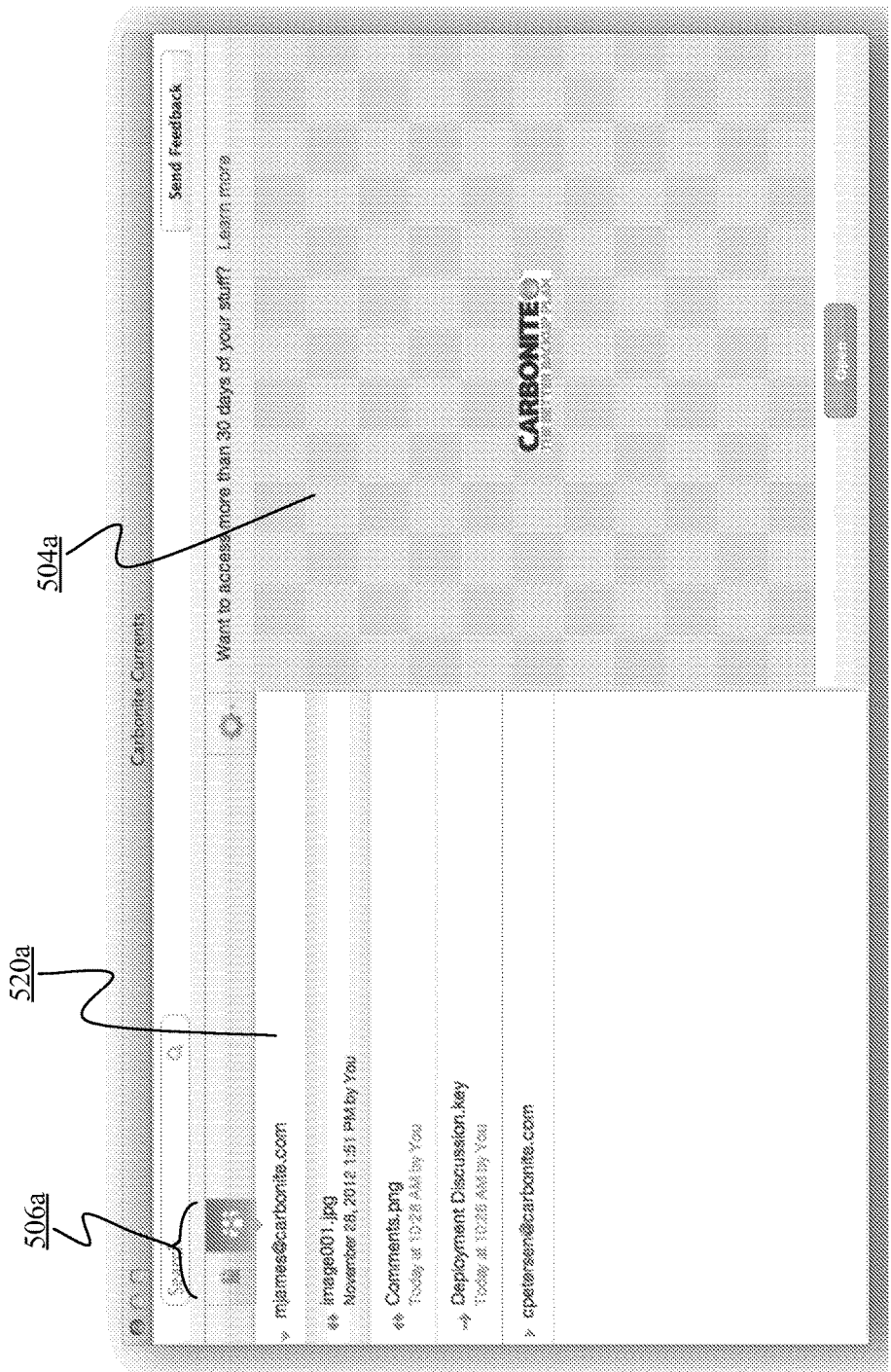
Figure 5G:
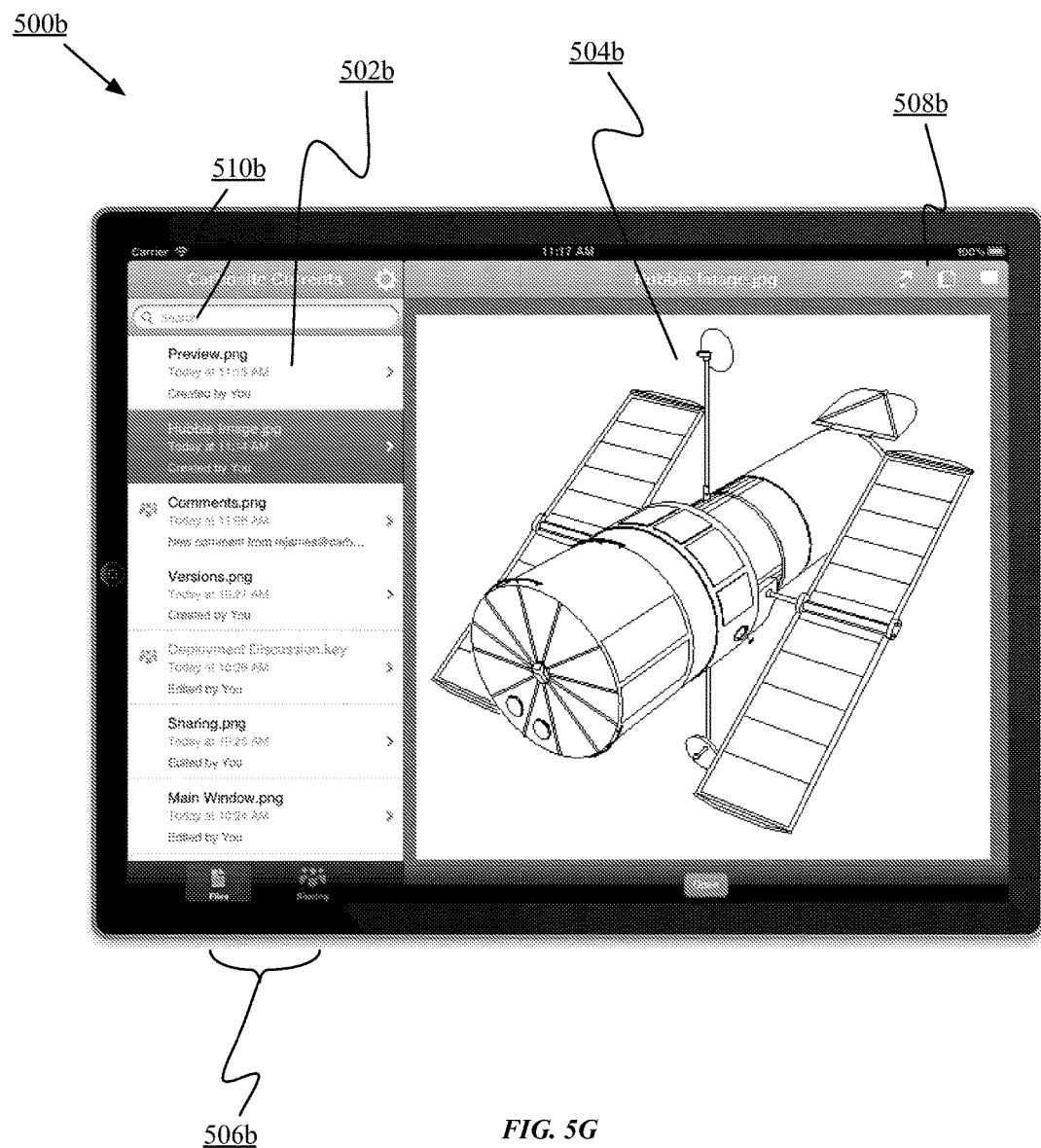
Figure 5H:
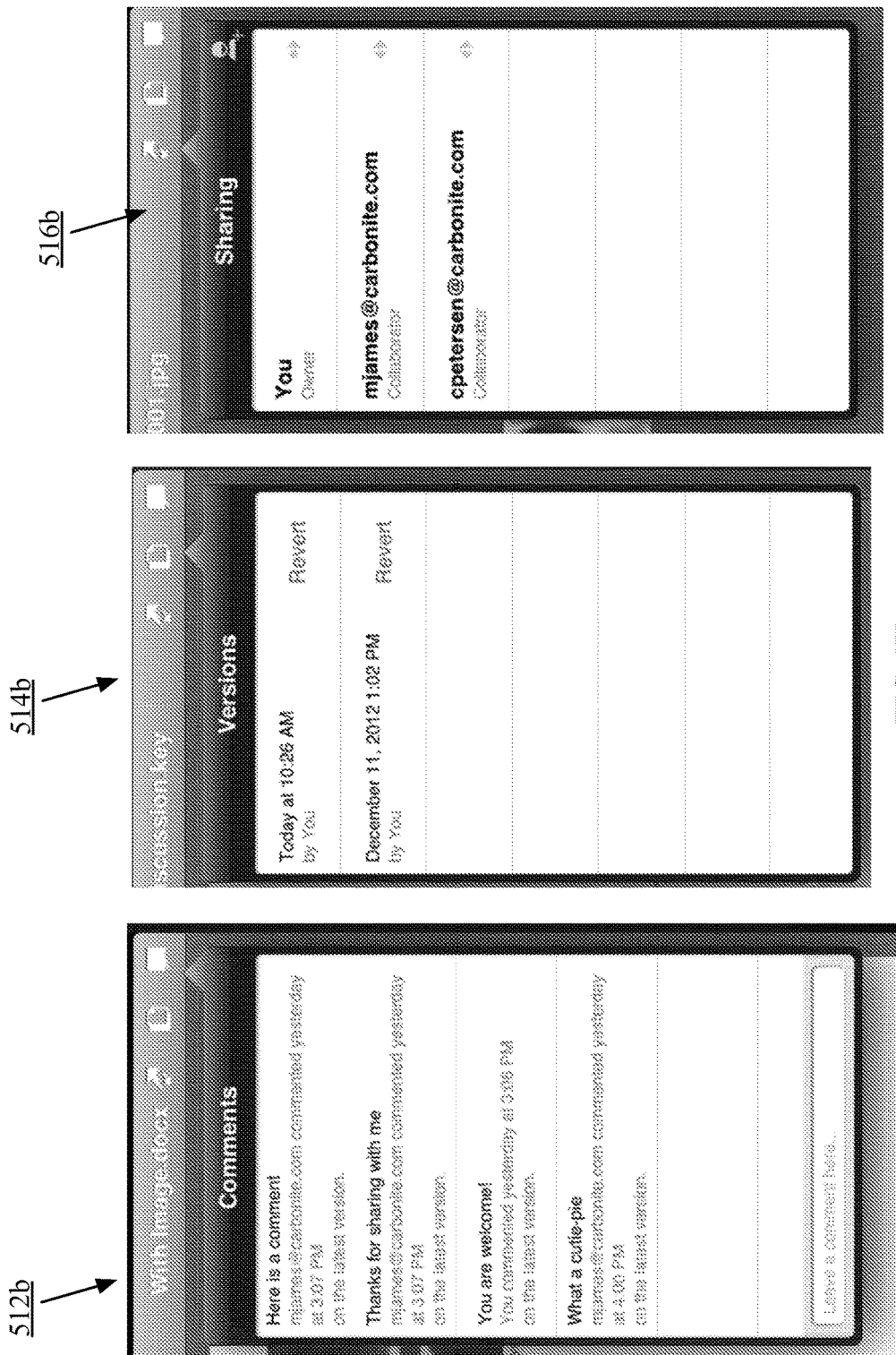
Figure 5I:
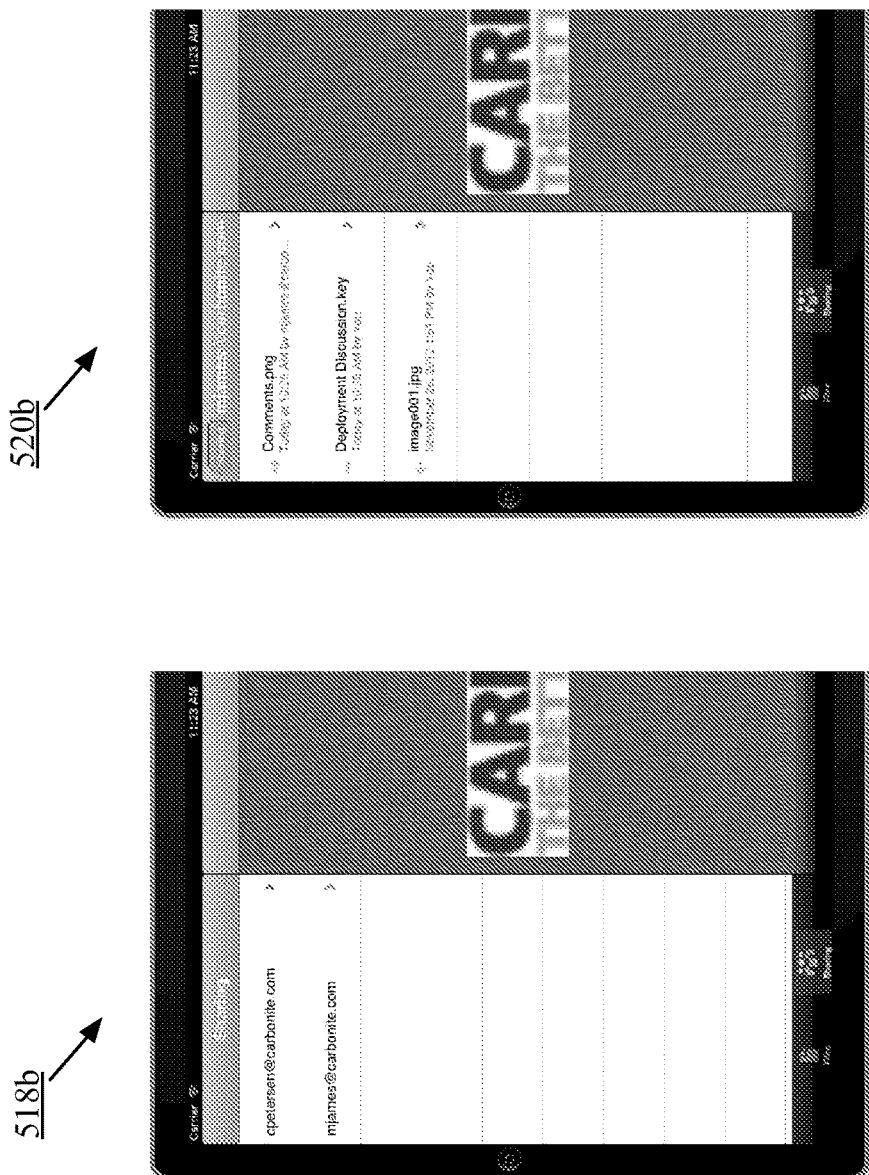
Figure 5J:
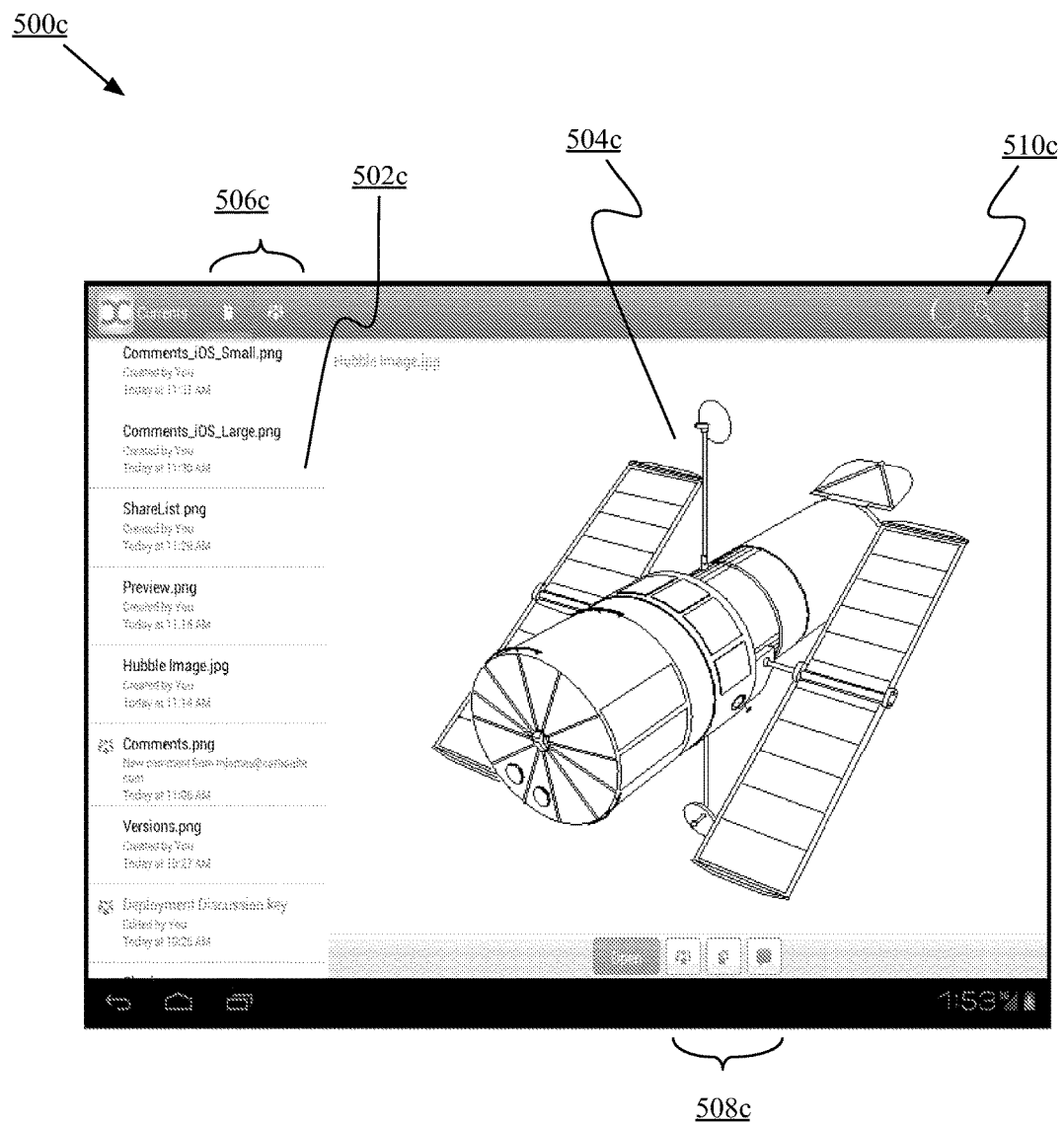
Figure 5K:
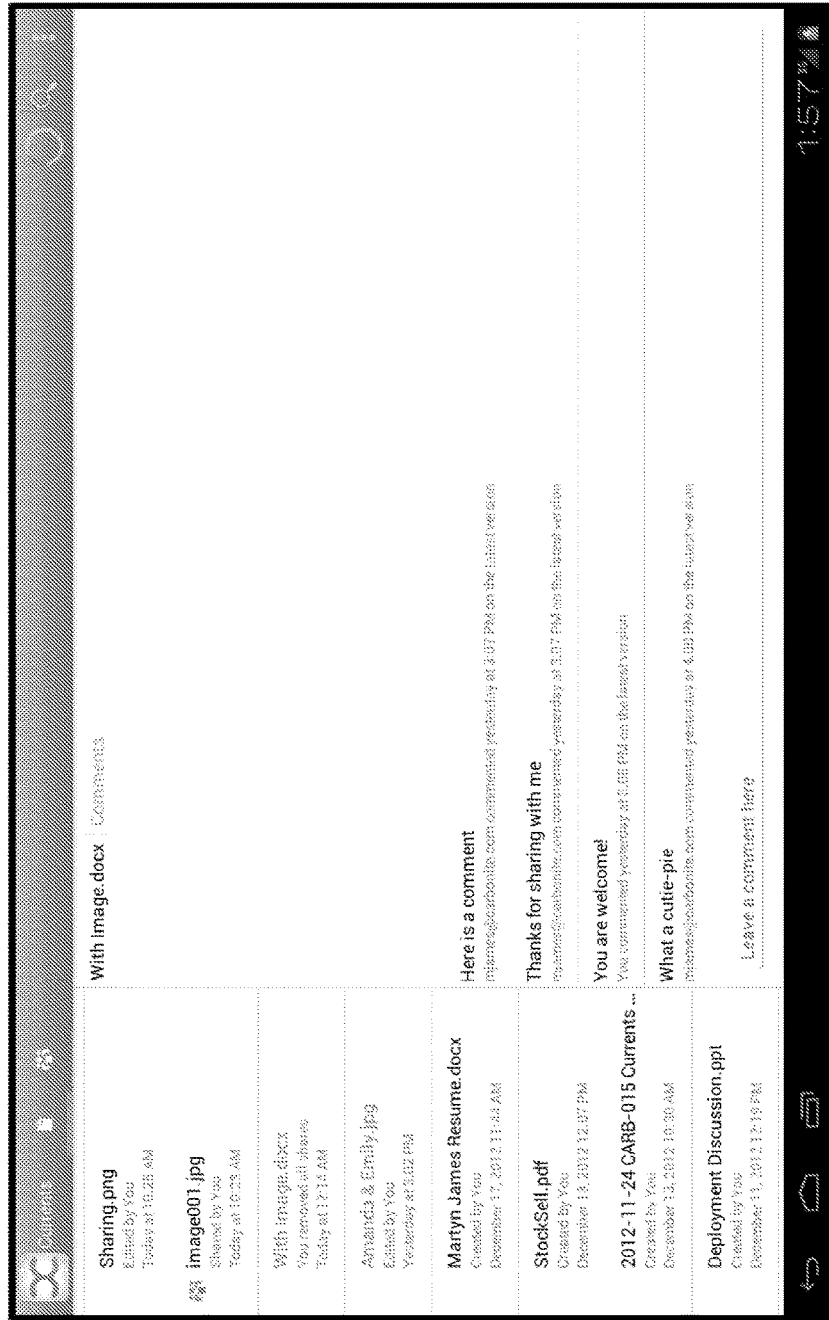
Figure 5L:
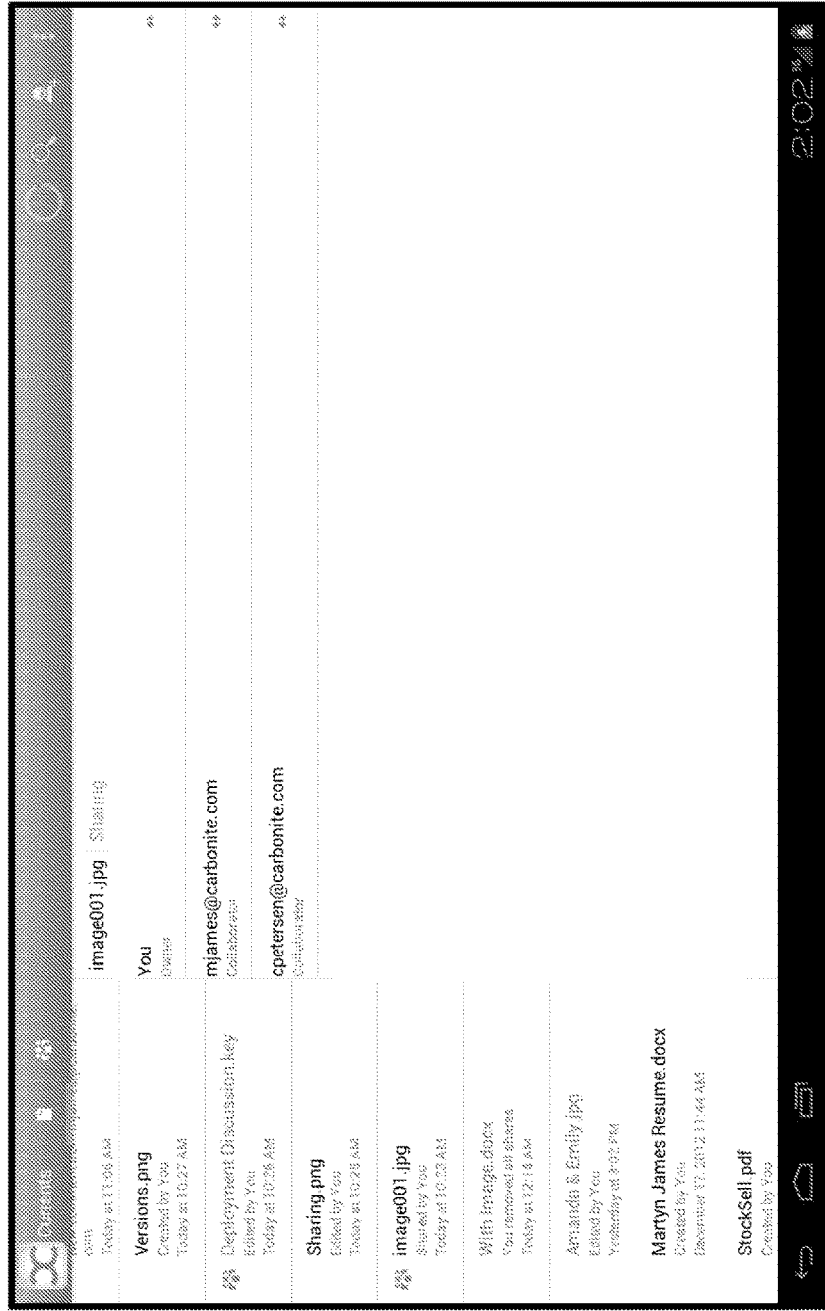
Figure 5M:
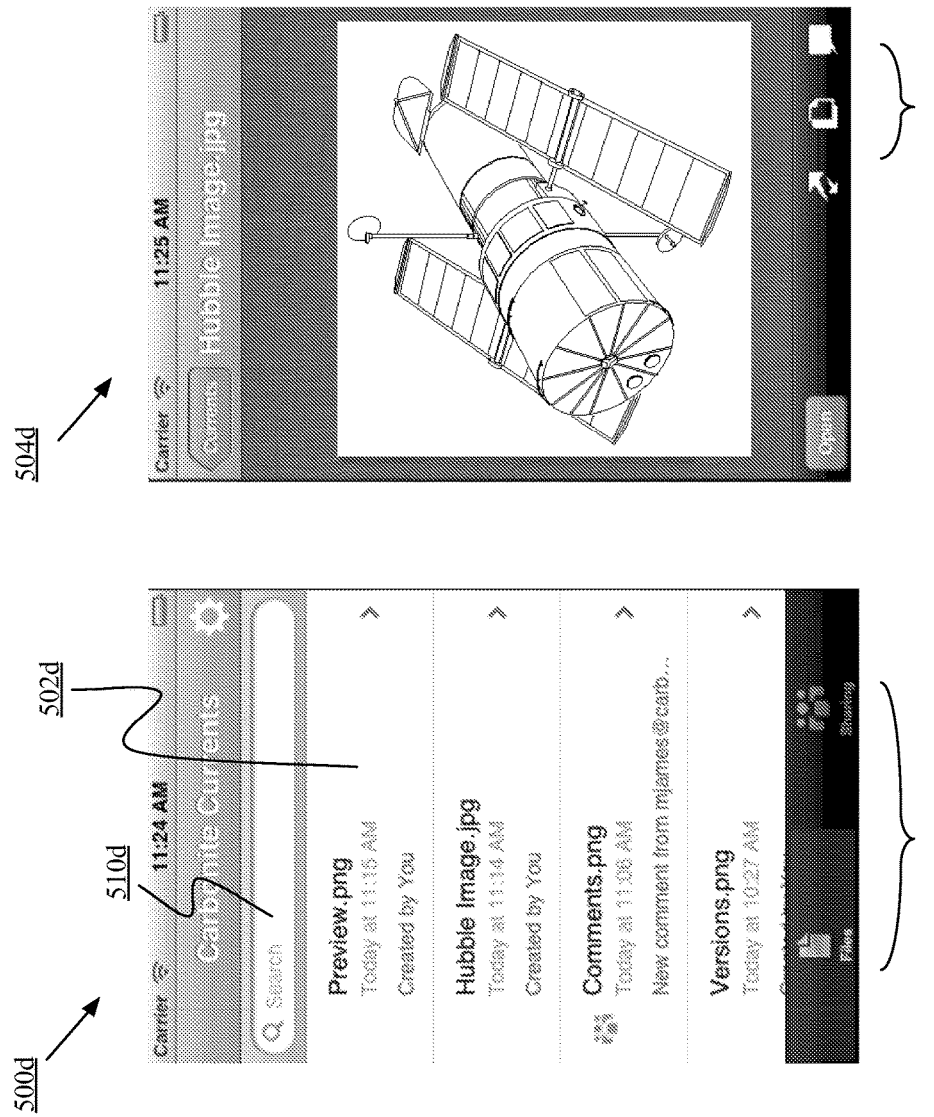
Figure 5N:
Figure 5N:
Figure 5N:
Figure 5O:
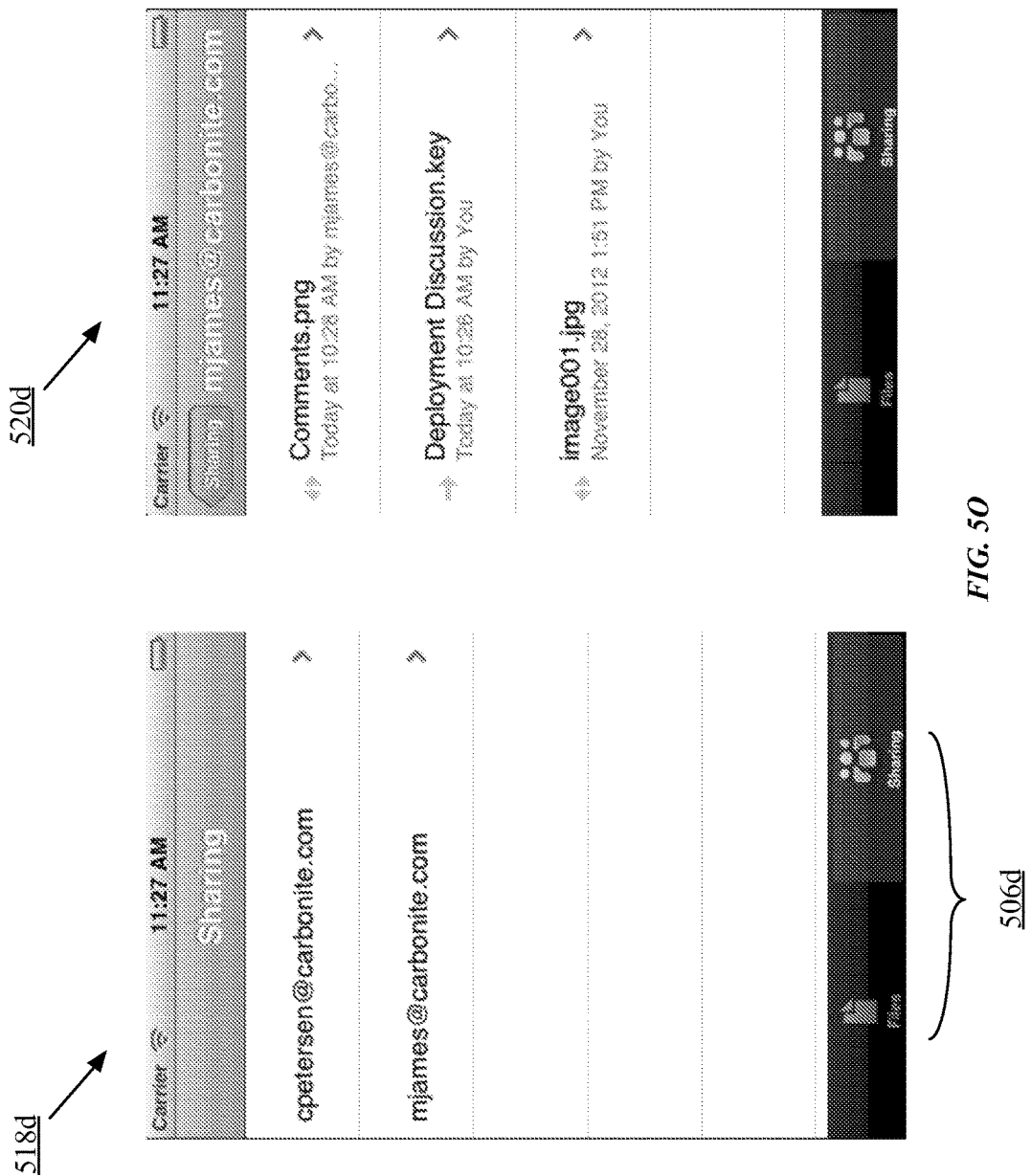
Figure 5P:
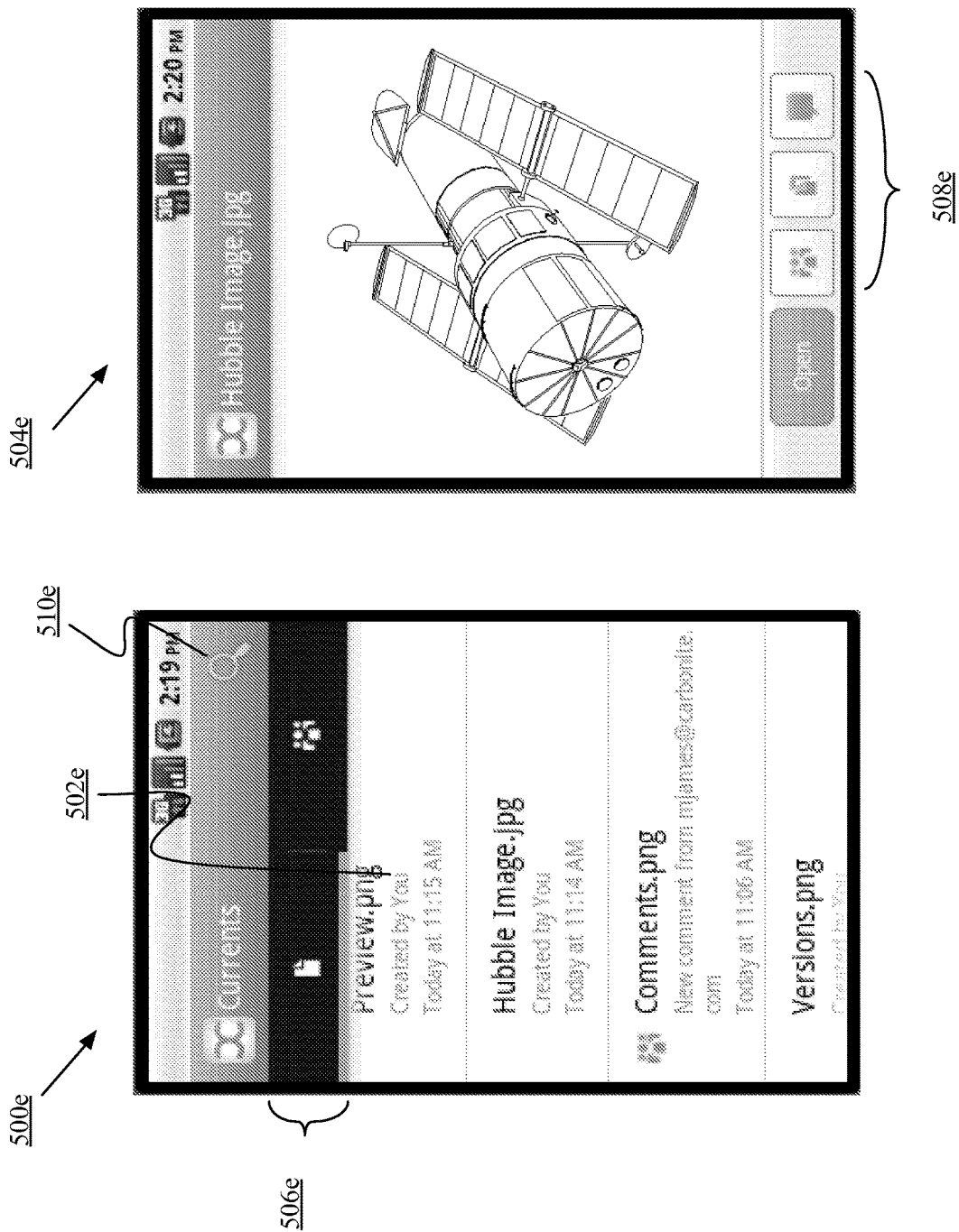
Figure 5Q:
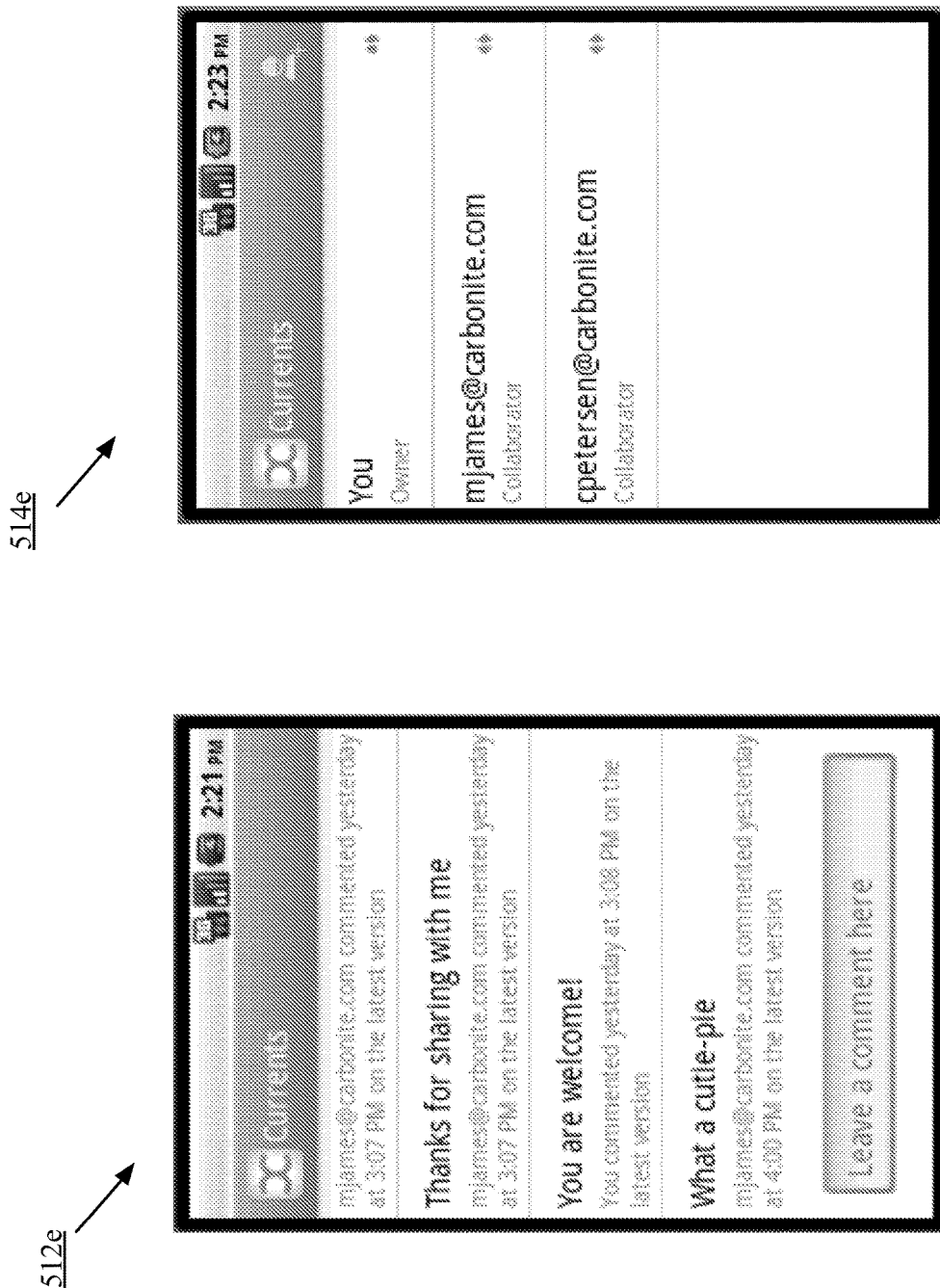

FIGS. 5A-5Q are screenshots of exemplary embodiments of a user interface for automatic synchronization and modification of files on a plurality of devices. Referring first to FIG. 5A, illustrated is an example screenshot of an embodiment of a main interface window 500*a*. As shown, in some embodiments, the interface window 500*a* may comprise two panels or frames, including a list of recently created, accessed, shared, and/or modified files 502*a*; and a preview window or frame 504*a*. In many embodiments, the system will display a preview of an image, text document, video, audio file, or other document in the preview frame 504*a* upon selection by a user of an item in list 502*a*. For example, referring to FIG. 5B, selecting a different item in the list 502*a* may cause the interface to display a different corresponding preview in frame 504*a*. In many embodiments, the user may click on an "open" button or similar element to open the file for editing or viewing or launch an associated application. In some embodiments, as shown, an icon may be displayed in the list 502*a* next to files that are shared with others. In many embodiments, physical location of the file or location of the file in a directory may not be displayed, as this information may not be relevant or necessary.

In some embodiments and as shown in FIGS. 5A and 5B, the user interface may include toggle buttons 506*a* allowing the user to select to view the list of files 502*a* in chronological order of access, creation, and/or modification (including modification of sharing rights or the addition of comments), or view a list of shared files grouped by creator or modifying user, discussed in more detail below in connection with FIG. 5F. Additionally, in many embodiments, the user interface may include icons 508*a* to allow a user to set or modify sharing preferences, view older versions of a file or view modification history for the file, and/or view or leave comments on the file. The user interface may also include a search element 510*a* to allow a user to search for a file by name, contents, metadata, creation or modification date, user name, or other criteria.

Referring now to FIG. 5C, illustrated is an exemplary embodiment of a user interface 512*a* for viewing and/or leaving comments on a file. In many embodiments, the user interface 512*a* may comprise a pop-up window or new window displayed over interface 500*a* upon selection by a user of a comment icon 508*a*. As shown, in many embodiments, the comment window 512*a* may display comments by a plurality of users on a file in chronological order. Each comment may be identified by a user name, time, and/or a version of the file. This may be useful in instances where a comment may apply to a previous version, such as a suggestion for a modification to the file. In many embodiments, the identification of a prior version of the file may comprise a link to the prior version of the file, allowing a user viewing the comment to retrieve and/or view the corresponding version.

Referring now to FIG. 5D, illustrated is an exemplary embodiment of a user interface 514*a* for viewing and/or reverting to prior versions in a version history for a file. As shown, in many embodiments, the version history may identify a time and/or date of a modification, a user performing the modification, and provide the ability to view or revert to previous versions of a file.

Illustrated in FIG. 5E is an exemplary embodiment of a user interface 516*a* for viewing and/or modifying or setting access and sharing controls for a file. A creator of a file may be designated as the owner, and others may be allowed to collaborate and modify the file, or view the file. In some embodiments, only the file owner may delete the file. Similarly, in some embodiments, only the file owner may add other users to the sharing list or grant permission to other users. In many embodiments, the owner of a file may transfer ownership to another user.

As discussed above and illustrated in FIG. 5F, in some embodiments, a user interface 518*a* may show a list of files 520*a* shared with the user, grouped by owner. Such user interfaces may be accessed via a toggle 506*a* as shown, in some embodiments. In some embodiments, as shown, a user may expand or collapse files owned by a user.

FIG. 5G is an illustration of another embodiment of a user interface 500*b*, similar to that shown in FIGS. 5A and 5B. As shown, the user interface 500*b* may comprise a list of files 502*b*, a preview window 504*b*, toggle buttons for viewing files in chronological order or grouped by owner 506*b*, commenting/version history/sharing icons 508*b*, and search box 510*b*. As shown in FIG. 5H, selecting an icon 508*b* may cause the user interface to display a corresponding pop-up or floating window for comments 512*b*, versions 514*b*, or sharing controls 516*b*. In some embodiments, and as illustrated in FIG. 5I, upon selection of toggle button 506*b* by a user to display files grouped by owner, the owners may be identified in a first list 518*b*. Upon selection of an owner by the user, a second list 520*b* of files shared by the selected owner may be displayed.

FIG. 5J is another exemplary embodiment of a user interface 500*c*, similar to user interfaces 500*a* and 500*b* discussed above. As shown, the user interface 500*c* may comprise a list of files 502*c*, a preview window 504*c*, toggle buttons for viewing files in chronological order or grouped by owner 506*c*, commenting/version history/sharing icons 508*c*. In some embodiments, rather than displaying a search box or field, the user interface may include a search icon 510*c* which may cause the user interface to display a search dialog (not illustrated). Similarly, in some embodiments, rather than showing comments 512*c*, sharing controls 514*c*, and version history (not illustrated) in pop-up or floating windows, the user interface may display these lists and controls in separate windows as illustrated in the embodiments of FIG. 5K and FIG. 5L.

Although shown with scaling and layout for tablets or desktop or laptop computers, other embodiments of the user interface may be used on smaller devices, such as smart phones. For example, referring to FIG. 5M, illustrated is an embodiment of a user interface 500*d* for a smart phone. As shown, the user interface 500*d* may include a list of files 502*d*, toggle buttons 506*d*, and search box 510*d*. Upon selection of a file by a user, the display may show a preview window 504*d*, with icons 508*d* for accessing comments, sharing settings, and version history, which may be displayed in corresponding windows 512*d*, 514*d*, and 516*d* illustrated in FIG. 5N. As discussed above and illustrated in FIG. 5O, in some embodiments, the user interface may display a list of owners sharing files with the user 518d and, upon selection of an owner, may display a list of files owned by the selected owner 520d.

Similarly, FIG. 5P shows another embodiment of a user interface 500e for a smart phone or similar device, including a list of files 502e, toggle buttons 506e, search button 510e, preview window 504e and icons 508e. As discussed above, comments 512e or sharing settings 516e for a file may be shown in a dedicated window, as shown in the example embodiment of FIG. 5Q.

Figure 6:
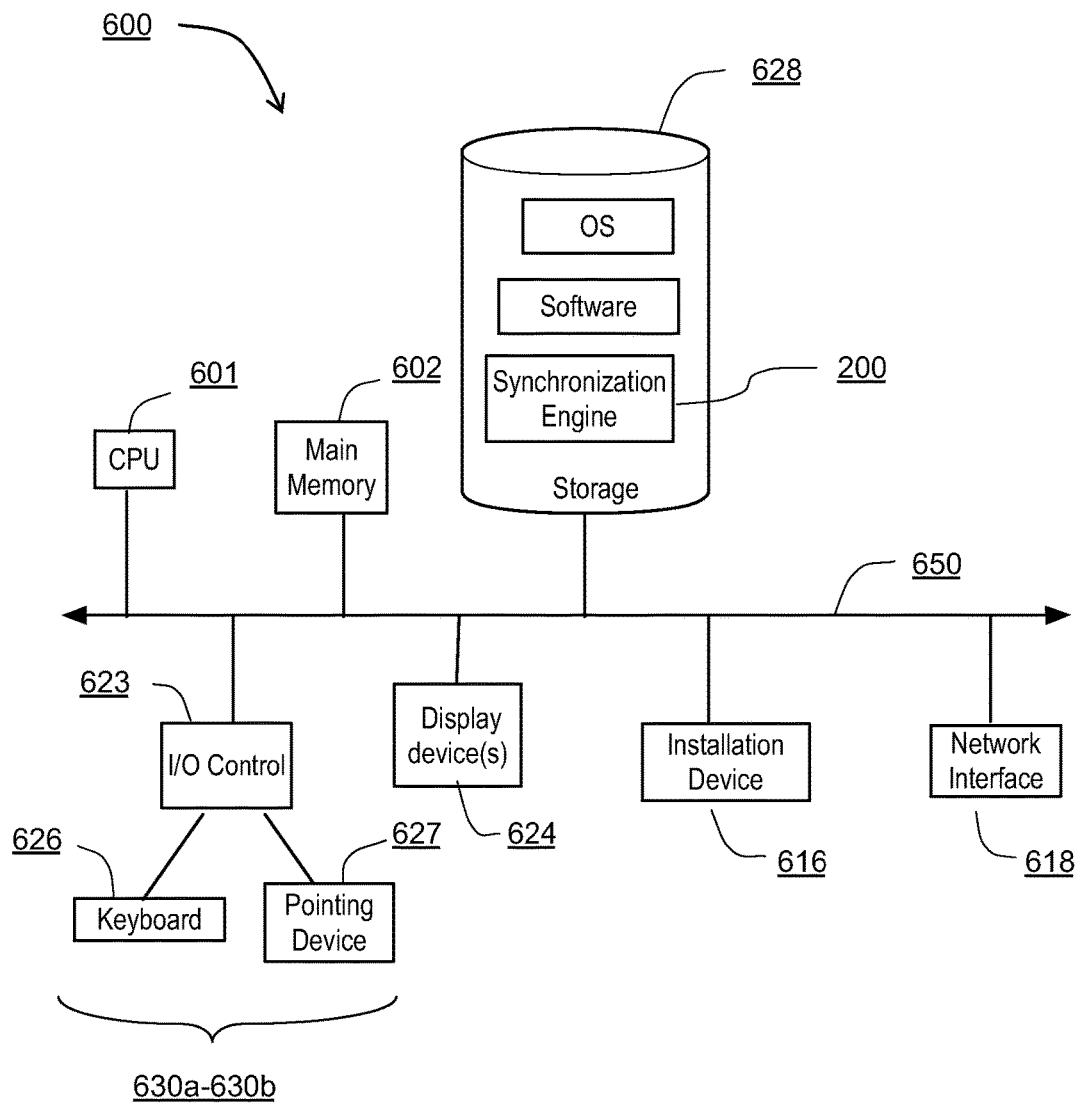
FIG. 6 is a block diagram of an exemplary computing device useful for practicing the methods and systems described herein.

FIG. 6 is a block diagram of an exemplary computing device useful for practicing the methods and systems described herein. The various devices 100, 114 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 6 depicts a block diagram of a computing device 600 useful for practicing an embodiment of the user devices 100 or device of an online storage or backup provider 114. A computing device 600 may include a central processing unit 601; a main memory unit 602; a visual display device 624; one or more input/output devices 630a-630b (generally referred to using reference numeral 630), such as a keyboard 626, which may be a virtual keyboard or a physical keyboard, and/or a pointing device 627, such as a mouse, touchpad, or capacitive or resistive single- or multi-touch input device; and a cache memory 640 in communication with the central processing unit 601.

The central processing unit 601 is any logic circuitry that responds to and processes instructions fetched from the main memory unit 602 and/or storage 628. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 602 may be one or more memory chips capable of storing data and allowing any storage location to be directly accessed by the microprocessor 601, such as random access memory (RAM) of any type. In some embodiments, main memory unit 602 may include cache memory or other types of memory.

The computing device 600 may support any suitable installation device 616, such as a floppy disk drive, a CD-ROM drive, a CD-R/RW drive, a DVD-ROM drive, tape drives of various formats, USB/Flash devices, a hard-drive or any other device suitable for installing software and programs such as any client agent 620, or portion thereof. The computing device 600 may further comprise a storage device 628, such as one or more hard disk drives or redundant arrays of independent disks, for storing an operating system and other related software, and for storing application software programs such as any program related to the client agent 620.

Furthermore, the computing device 600 may include a network interface 618 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 618 may comprise a built-in network adapter, network interface card, PCMCIA network card, card bus network adapter, wireless network adapter, USB network adapter, cellular modem or any other device suitable for interfacing the computing device 600 to any type of network capable of communication and performing the operations described herein.

A wide variety of I/O devices 630a-630n may be present in the computing device 600. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 630 may be controlled by an I/O controller 623 as shown in FIG. 6. The I/O controller may control one or more I/O devices such as a keyboard 626 and a pointing device 627, e.g., a mouse, optical pen, or multi-touch screen. Furthermore, an I/O device may also provide storage 628 and/or an installation medium 616 for the computing device 600. The computing device 600 may provide USB connections to receive handheld USB storage devices such as the USB Flash Drive line of devices manufactured by Twintech Industry, Inc. of Los Alamitos, Calif.

The computing device 600 may comprise or be connected to multiple display devices 624a-624n, which each may be of the same or different type and/or form. As such, any of the I/O devices 630a-630n and/or the I/O controller 623 may comprise any type and/or form of suitable hardware, software embodied on a tangible medium, or combination of hardware and software to support, enable or provide for the connection and use of multiple display devices 624a-624n by the computing device 600. For example, the computing device 600 may include any type and/or form of video adapter, video card, driver, and/or library to interface, communicate, connect or otherwise use the display devices 624a-624n. A video adapter may comprise multiple connectors to interface to multiple display devices 624a-624n. The computing device 600 may include multiple video adapters, with each video adapter connected to one or more of the display devices 624a-624n. Any portion of the operating system of the computing device 600 may be configured for using multiple displays 624a-624n. Additionally, one or more of the display devices 624a-624n may be provided by one or more other computing devices, such as computing devices 600a and 600b connected to the computing device 600, for example, via a network. These embodiments may include any type of software embodied on a tangible medium designed and constructed to use another computer's display device as a second display device 624a for the computing device 600. One ordinarily skilled in the art will recognize and appreciate the various ways and embodiments that a computing device 600 may be configured to have multiple display devices 624a-624n.

A computing device 600 of the sort depicted in FIG. 5 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 600 may have different processors, operating systems, and input devices consistent with the device. For example, in one embodiment, the computer 600 is an Apple iPhone or Motorola Droid smart phone, or an Apple iPad or Samsung Galaxy Tab tablet computer, incorporating multi-input touch screens. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method for automatic synchronization of recently modified data between a plurality of devices, comprising:
    receiving, by a first device from a second device, a modified version of a first file stored in a folder of a storage device of the first device, wherein the modified version of the first file is received by the first device from the second device without identification of a location of the folder, and wherein folder paths of the first device and the second device corresponding to storage of the first file are not synchronized;
    retrieving, by the first device, the identification of the location of the folder from a second file stored on the storage device of the first device; and
    replacing, by the first device, an unmodified version of the first file in the folder with the modified version of the first file.

2. The method of claim 1, further comprising detecting a further modification to the first file, by the first device; and determining to synchronize the further modification to the first file to the second device.

3. The method of claim 2, further comprising identifying, from a file system of the first device, a plurality of files including the first file, and determining to synchronize the first file responsive to an active window title bar name of the second device comprising a name of the first file.

4. The method of claim 2, further comprising transmitting the further modified version of the first file, by the first device to the second device, responsive to the determination to synchronize the further modification to the first file to the second device.

5. The method of claim 1, wherein the identification of the location of the folder is not transmitted to the second device by the first device.

6. The method of claim 1, further comprising:
    identifying, by the first device, the first file stored in the folder in the storage device of the first device; and
    storing, by the first device responsive to identification of the first file stored in the folder, the identification of the location of the folder in the second file.

7. A system for automatic synchronization of recently modified data between a plurality of devices, comprising:
    a first device comprising a processor, a storage device, and a network interface, wherein the processor is configured to execute a synchronization engine, and wherein the storage device stores a first file in a folder of a directory structure, and a second file comprising an identification of a location of the folder,
    wherein the network interface is configured to receive, from a second device, a modified version of the first file stored in the folder, wherein the modified version of the first file is received by the first device from the second device without the identification of the location of the folder, and wherein folder paths of the first device and the second device corresponding to storage of the first file are not synchronized, and
    wherein the synchronization engine is configured to retrieve the identification of the location of the folder from the second file, and replace an unmodified version of the first file in the folder with the modified version of the first file.

8. The system of claim 7, wherein the synchronization engine is further configured to detect a further modification to the first file, and determine to synchronize the further modification to the first file to the second device.

9. The system of claim 8, wherein the synchronization engine is further configured to identify, from the directory structure, a plurality of files including the first file, and determine to synchronize the first file of the plurality of files responsive to an active window title bar name comprising a name of the first file.

10. The system of claim 8, wherein the network interface is further configured to transmit a further modified version of the first file, to the second device, responsive to the determination to synchronize the further modification to the first file to the second device.

11. The system of claim 7, wherein the identification of the location of the folder is not transmitted to the second device by the network interface.

12. The system of claim 7, further comprising:
  wherein the synchronization engine is further configured to identify the first file stored in the folder in the storage device; and
  wherein the synchronization engine is further configured to store, responsive to identification of the first file stored in the folder, the identification of the location of the folder in the second file.

\* \* \* \* \*